United States Patent
Ikeda

(10) Patent No.: US 12,229,648 B2
(45) Date of Patent: *Feb. 18, 2025

(54) TRAINING DATA GENERATING DEVICE, METHOD, AND PROGRAM, AND CROWD STATE RECOGNITION DEVICE, METHOD, AND PROGRAM

(71) Applicant: NEC Corporation, Tokyo (JP)

(72) Inventor: Hiroo Ikeda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/218,916

(22) Filed: Jul. 6, 2023

(65) Prior Publication Data

US 2023/0351259 A1 Nov. 2, 2023

Related U.S. Application Data

(60) Continuation of application No. 17/379,392, filed on Jul. 19, 2021, now Pat. No. 11,836,586, which is a division of application No. 16/689,406, filed on Nov. 20, 2019, now Pat. No. 11,132,587, which is a division of application No. 16/209,290, filed on Dec. 4, 2018, now Pat. No. 10,515,294, which is a division of application No. 15/667,937, filed on Aug. 3, 2017, (Continued)

(30) Foreign Application Priority Data

Jun. 28, 2013 (JP) .................................. 2013-135915

(51) Int. Cl.
*G06N 20/00* (2019.01)
*G06V 20/52* (2022.01)

(52) U.S. Cl.
CPC ............ *G06N 20/00* (2019.01); *G06V 20/53* (2022.01)

(58) Field of Classification Search
CPC ............................... G06N 20/00; G06V 20/53
See application file for complete search history.

(56) References Cited

U.S. PATENT DOCUMENTS

| | | |
|---|---|---|
| 7,139,409 B2 | 11/2006 | Paragios et al. |
| 7,457,436 B2 | 11/2008 | Paragios et al. |
| | (Continued) | |

FOREIGN PATENT DOCUMENTS

| | | |
|---|---|---|
| CN | 1983303 A | 6/2007 |
| CN | 101504719 A | 8/2009 |
| | (Continued) | |

OTHER PUBLICATIONS

Hung et al., Real-Time Counting People in Crowded Areas by Using Local Empirical Templates and Density Ratios, IEIQE Trans, published Jul. 2012, p. 1791-1803. (Year: 2012).*

(Continued)

*Primary Examiner* — Mekonen T Bekele
(74) *Attorney, Agent, or Firm* — Sughrue Mion, PLLC

(57) ABSTRACT

At least one processor generates a crowd state image as an image in which a person image corresponding to a person state is synthesized with previously-prepared image at a predetermined size. The previously-prepared image is an background image that include no person. The at least one processor specifies a training label for the crowd state image. The at least one processor outputs a pair of crowd state image and training label.

13 Claims, 14 Drawing Sheets

Related U.S. Application Data now Pat. No. 10,223,620, which is a division of application No. 14/899,340, filed as application No. PCT/JP2014/002670 on May 21, 2014, now Pat. No. 9,875,431.

(56) References Cited

U.S. PATENT DOCUMENTS

| | | | |
|---|---|---|---|
| 7,995,843 B2 | 8/2011 | Iwasaki et al. | |
| 9,208,386 B1 | 12/2015 | Kobold | |
| 10,223,620 B2 | 3/2019 | Ikeda | G06V 20/53 |
| 10,515,294 B2 | 12/2019 | Ikeda | |
| 10,776,674 B2 * | 9/2020 | Ikeda | G06V 20/53 |
| 2002/0037770 A1 | 3/2002 | Paul et al. | |
| 2002/0111882 A1 | 8/2002 | Kunigita | |
| 2006/0195199 A1 | 8/2006 | Iwasaki et al. | |
| 2007/0031005 A1 | 2/2007 | Paragios et al. | |
| 2008/0166020 A1 | 7/2008 | Kosaka et al. | |
| 2009/0060295 A1 | 3/2009 | Inoue et al. | |
| 2009/0222388 A1 | 9/2009 | Hua et al. | |
| 2010/0322516 A1 | 12/2010 | Xu et al. | |
| 2011/0293148 A1 | 12/2011 | Kobayashi | |
| 2013/0113934 A1 | 5/2013 | Hotta et al. | |
| 2015/0294193 A1 | 10/2015 | Tate | G06F 18/22 382/159 |
| 2016/0133025 A1 | 5/2016 | Wang et al. | |
| 2016/0226610 A1 | 8/2016 | Pinzon Gonzales, Jr. | H04N 21/466 |
| 2016/0335552 A1 | 11/2016 | Longo et al. | |
| 2017/0017846 A1 | 1/2017 | Felemban et al. | |
| 2017/0132475 A1 | 5/2017 | Oami et al. | |
| 2017/0213090 A1 | 7/2017 | Oami et al. | |
| 2017/0220871 A1 | 8/2017 | Ikeda | |
| 2017/0330061 A1 | 11/2017 | Ikeda | |
| 2017/0351924 A1 | 12/2017 | Hotta et al. | |
| 2018/0197300 A1 | 7/2018 | Okumura | H04N 7/18 |
| 2019/0087664 A1 | 3/2019 | Ito | |
| 2019/0360714 A1 | 11/2019 | Konrad | F24F 11/88 |

FOREIGN PATENT DOCUMENTS

| | | |
|---|---|---|
| CN | 101777114 A | 7/2010 |
| CN | 101959060 A | 1/2011 |
| CN | 101980245 A | 2/2011 |
| CN | 101990667 A | 3/2011 |
| CN | 102063613 A | 5/2011 |
| CN | 102422325 A | 4/2012 |
| CN | 102663369 A | 9/2012 |
| CN | 102722699 A | 10/2012 |
| EP | 1 998 286 A1 | 12/2008 |
| JP | 2007-249588 A | 9/2007 |
| JP | 2007-329762 A | 12/2007 |
| JP | 2008-140107 A | 6/2008 |
| JP | 2010-198566 A | 9/2010 |
| JP | 2011-076316 A | 4/2011 |
| JP | 2011-100175 A | 5/2011 |
| JP | 2012-022370 A | 2/2012 |

OTHER PUBLICATIONS

Chinese Office Action issued by the State Intellectual Property Office of the People's Republic of China for Chinese Application No. 2014800366618 dated Dec. 27, 2017 (16 pages).
Dao-Huu Hung, et al. "Real-Time Counting People in Crowded Areas by Using LocalEmpirical Templates and Density Ratios", IEICE Transactions on Information and Systems, vol. E95.D, No. 7, XP055332714, Jan. 1, 2012, pp. 1791-1803, (13 pages).
Drewa, Jr., P., et al., "Crowd behavior analysis under cameras network fusion using probabillstic methods," University of Coimber, Portugal, Jul. 26-29, 2010 (8 pages).
Extended European Search Report issued by the European Patent Office for Application No. 14817648.0 dated May 15, 2017 (16 pages).
Extended European Search Report issued by the European Patent Office for European Application No. 17199965.9 dated Feb. 7, 2018 (10 pages).
Haritaoglu, I., et al., "W[4]: Real-Time Surveillance of People and Their Activities," IEEE Transactions on Pattern Analysis and Machine Intelligence, IEEE Computer Society, XP000976488, vol. 22, No. 8, pp. 809-830 (Aug. 1, 2000).
International Search Report corresponding to PCT/JP2014/002670, dated Aug. 19, 2014 (5 pages).
Julio Cezar Silveira Jacques Junior et al. "Crowd Analysis Using Computer Vision Techniques", IEEE Signal Processing Magazine, IEEE Service Center, Piscataway, NJ, US, vol. 27, No. 5, SP011317651, Sep. 1, 2010, pp. 66-77 (12 pages).
Ma, W., et al., "Crowd Density Analysis Using Co-occurrence Textue Features," IEEE 5th International Conference on Computer Sciences and Convergence Information Technology, XP031978828, pp. 170-175 (Nov. 30, 2010).
Partial Supplementary European Search Report issued in corresponding European Patent Application No. 14817648.0, dated Jan. 17, 2017, 8 pages.
Pishchulin, L., et al., "Learning People Detection Models from Few Training Samples", Conmputer Vision and Patern Recognition (CVPR), 2011 IEEE Conference On, IEEE, XP032038076, Jun. 20, 2011, pp. 1473-1480 (8 pages).
Rodriguez, M., et al., "Data-Driven Crowd Analysis in Videos," IEEE International Conference on Computer Vision, XP032101327, pp. 1235-1242 (Nov. 6, 2011).
Sirmacek, B. and Reinartz, P., "Automatic crowd density and motion analysis in airborne image sequences based on a probabilistic framework," German Aerospace Center, Remote Sensing Technology Institute, EEE, pp. 898-905 (Nov. 6-13, 2011).
U.S. Office Action issued by the U.S. Patent and Trademark Office for the U.S. Appl. No. 15/667,937 dated Sep. 29, 2017 (29 pages).
USPTO Non-Final Office Action issued in U.S. Appl. No. 16/209,290, dated May 15, 2019, 36 pages.
Yuen, J. and Torralba, A., "A Data-Driven Approach for Event Prediction," Computer Vision—ECCV 2010, Springer Berlin Heidelberg, XP019150605 pp. 707-720 (Sep. 5, 2010).
Jun Sang et al., "Improved Crowd Counting Method Based on Scale-Adaptive Convolutional Neural Network," IEEE, vol. 7, 2019, (Year: 2019) (9 pages).
Chinese Office Action for CN Application No. 201810432697.8 mailed on Jul. 5, 2021 with English Translation.
CN Office Action for CN Application No. 2018104326978, mailed on Nov. 11, 2022 with English Translation.
John Wright et al., "Robust Face Recognition via Sparse Representation", IEEE Transactions on Pattern Analysis and Machine Intelligence, vol. 31, No. 2, Feb. 2009, pp. 1-18.
Real-Time Counting People in Crowded Areas by Using Local Empirical Templates and Density Ratios, IEICE Trans. Inf. & Syst., vol. E95-D, No. 7 published Jul. 2012, p. 1791-1803 (Year: 2012).
Hung et al., Real-Time Counting People in Crowded Areas by Using Local Empirical Templates and Density Ratios, IEICE Trans. Inf. & Syst., vol. E95-D, No. 7 published Jul. 2012, p. 1791-1803, (IDS Item) (Year: 2012).
US Office Action for U.S. Appl. No. 18/218,903, mailed on Jul. 5, 2024.

* cited by examiner

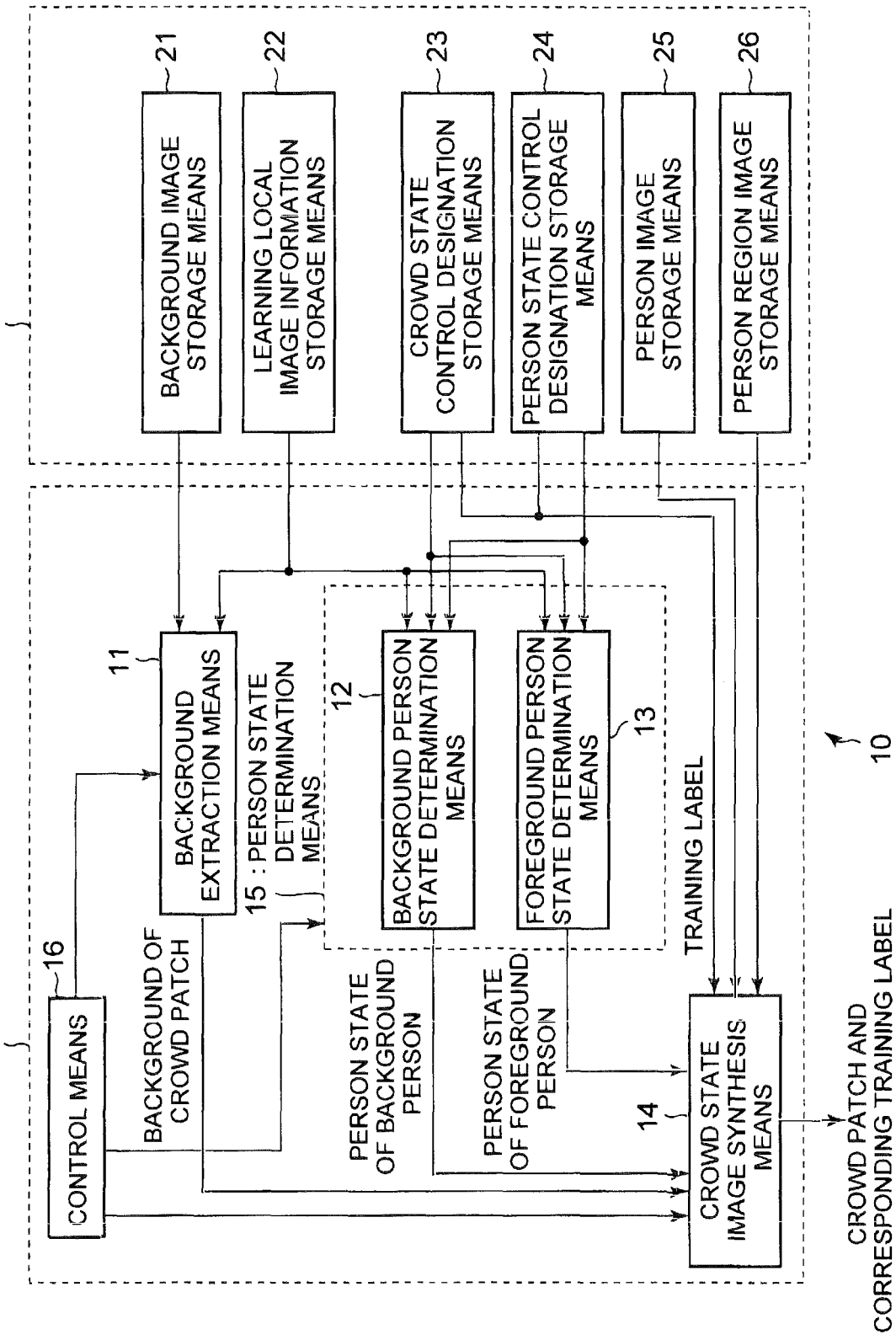

FIG. 2

EXEMPLARY STRUCTURE OF DATA STORED IN CROWD STATE CONTROL DESIGNATION STORAGE MEANS

| PERSON STATE FOR PEOPLE | PEOPLE STATE CONTROL DESIGNATION | TRAINING LABEL |
|---|---|---|
| ARRANGEMENT RELATIONSHIP BETWEEN PERSONS ※ARRANGEMENT OF PERSON | RANDOM | × |
| DIRECTION RELATIONSHIP BETWEEN PERSONS ※DIRECTION OF PERSON | RANDOM | × |
| NUMBER OF PERSONS | PREDETERMINED STATE = THREE PERSONS | ○ |

FIG. 3

EXEMPLARY STRUCTURE OF DATA STORED IN PERSON STATE CONTROL DESIGNATION STORAGE MEANS

| PERSON STATE OF EACH PERSON | INDIVIDUAL PERSON STATE CONTROL DESIGNATION | TRAINING LABEL |
|---|---|---|
| SHOOTING ANGLE OF PERSON | PREDETERMINED RULE = CALCULATION USING EQUATION BASED ON CAMERA PARAMETERS FROM PERSON ARRANGEMENT ON SYNTHESIS | × |
| ILLUMINATION TO PERSON | RANDOM | × |
| POSTURE OF PERSON | PERSON STATE = WALKING | ○ |

TRAINING DATA GENERATING DEVICE, METHOD, AND PROGRAM, AND CROWD STATE RECOGNITION DEVICE, METHOD, AND PROGRAM

CROSS-REFERENCE TO RELATED APPLICATIONS

This application is a continuation of U.S. patent application Ser. No. 17/379,392 filed on Jul. 19, 2021, which is a divisional of U.S. patent application Ser. No. 16/689,406, filed on Nov. 20, 2019, which has been issued as U.S. Pat. No. 11,132,587, which is a divisional of U.S. patent application Ser. No. 16/209,290, filed on Dec. 4, 2018, which has been issued as U.S. Pat. No. 10,515,294, which is a divisional of U.S. patent application Ser. No. 15/667,937, filed on Aug. 3, 2017, which has been issued as U.S. Pat. No. 10,223,620, which is a divisional of U.S. patent application Ser. No. 14/899,340, filed on Dec. 17, 2015, which has been issued as U.S. Pat. No. 9,875,431, which is a national stage application of International Application No. PCT/JP2014/002670, filed on May 21, 2014, which claims priority to Japanese Patent Application No. 2013-135915, filed on Jun. 28, 2013, the disclosures of each which are hereby incorporated by reference in their entirety.

TECHNICAL FIELD

The present invention relates to a training data generating device for generating training data, a training data generating method, and a training data generating program as well as a crowd state recognition device for recognizing a state of a crowd in an image, a crowd state recognition method, and a crowd state recognition program.

BACKGROUND ART

Various techniques for recognizing a state of a crowd (which will be denoted as crowd state below) in an image are proposed (see PTLs 1 to 3).

A person behavior determination device described in PTL 1 extracts a changed region in which a difference is caused by background differencing or the like from a video, and calculates the characteristic amount from the changed region. The person behavior determination device then determines whether the changed region is a person region by use of a person discriminator machine-learning the characteristic amount, thereby detecting the person region. Further, the person behavior determination device associates the detected person region between frames in consideration of distance or color histogram, and tracks the person region over a predetermined number of frames. The person behavior determination device then calculates the characteristic amount of a person trajectory such as average speed, tracking time and motion direction from the person trajectory acquired by the tracking, and determines a person behavior based on the characteristic amount of the person trajectory.

A headcount counting device described in PTL 2 counts the number of persons from a video shooting a crowd therein. The headcount counting device extracts the heads of persons included in the image based on head models. The headcount counting device then links the head positions determined as the same person between frames by use of the characteristic amount such as position information or color distribution, and counts the number of persons from the linking result (person tracking result).

A system described in PTL 3 detects a state such as steady (main stream of persons, for example)/non-steady (against main stream, for example). The system aggregates optical flow attributes for a determination block as a determination unit, and calculates an evaluation value for evaluating a degree of steadiness of optical flow. The system then determines a state of the determination block from the evaluation value.

CITATION LIST

Patent Literatures

PTL 1: Japanese Patent Application Laid-Open No. 2011-100175 (paragraphs 0028 to PTL 2: Japanese Patent Application Laid-Open No. 2010-198566 (paragraphs 0046 to PTL 3: Japanese Patent Application Laid-Open No. 2012-22370 (Paragraph 0009)

SUMMARY OF INVENTION

Technical Problem

With the techniques described in PTLs 1 to 3, a determination performance lowers for a video at a low frame rate. In particular, with the techniques described in PTL 1 to 3, a crowd state in an image cannot be determined for a still image.

This is because the techniques described in PTLs 1 to 3 use each frame in a video and a state determination performance depends on an interval between frames. For example, with the technique described in PTL 1, person regions are associated between frames thereby to acquire a person trajectory. Further, with the technique described in PTL 2, the head positions are linked between frames and the result thereof is assumed as a person tracking result. When such a trajectory or tracking result is acquired, the person regions or head positions need to be associated between frames. At this time, the motion amount of a person is larger at a lower frame rate, and accordingly a change in the person region or the head position or a change in shape (posture) increases. Further, influences due to disturbance of illumination or the like also increase. Therefore, the person regions or the head positions are difficult to associate between frames. Consequently, an accuracy of person trajectory or the like lowers and an accuracy of determining a crowd state in an image lowers. Furthermore, also with the technique described in PTL 3, an optical flow is difficult to correctly find at a low frame rate, and consequently an accuracy of aggregated attributes lowers and a state determination performance lowers.

For example, there is assumed a method using a discriminator with a learned dictionary in order to recognize a crowd state in an image. The dictionary is learned by training data such as images indicating crowd states. However, a large amount of training data (learning data) used for learning a dictionary needs to be collected. For example, arrangement of person (overlap between persons or deviation of person positions), direction of person, and density (persons per unit region) need to be defined in various states, and a large number of images in which shooting angle, background, illumination, clothes or posture of person, and the like are variously changed in each state need to be collected. Machine learning is performed by use of the images so that a dictionary of the discriminator is acquired. However, working loads for collecting training data increase when collecting a large amount of such training data.

It is therefore an object of the present invention to provide a training data generating device capable of easily generating a large amount of training data used for machine-learning a dictionary of a discriminator for recognizing a crowd state, a training data generating method, and a training data generating program.

It is another object of the present invention to provide a crowd state recognition device capable of preferably recognizing a crowd state in an image irrespective of a frame rate, a crowd state recognition method, and a crowd state recognition program.

Solution to Problem

A training data generating device according to the present invention includes: at least one processor configured to: generate a crowd state image as an image in which a person image corresponding to a person state is synthesized with previously-prepared image at a predetermined size, the previously-prepared image being an background image that include no person; specify a training label for the crowd state image; and output a pair of crowd state image and training label.

Advantageous Effects of Invention

With the training data generating device, the training data generating method, and training data generating program according to the present invention, it is possible to easily generate a large amount of training data used for machine-learning a dictionary of a discriminator for recognizing a crowd state.

With the crowd state recognition device, the crowd state recognition method, and the crowd state recognition program according to the present invention, it is possible to preferably recognize a crowd state in an image irrespective of a frame rate.

BRIEF DESCRIPTION OF DRAWINGS

FIG. 1 It depicts a block diagram illustrating an exemplary structure of a training data generating device according to the present invention.

FIG. 2 It depicts a schematic diagram illustrating exemplary information stored in a crowd state control designation storage means.

FIG. 3 It depicts a schematic diagram illustrating exemplary information stored in a person state control designation storage means.

DESCRIPTION OF EMBODIMENTS

Figure 4:
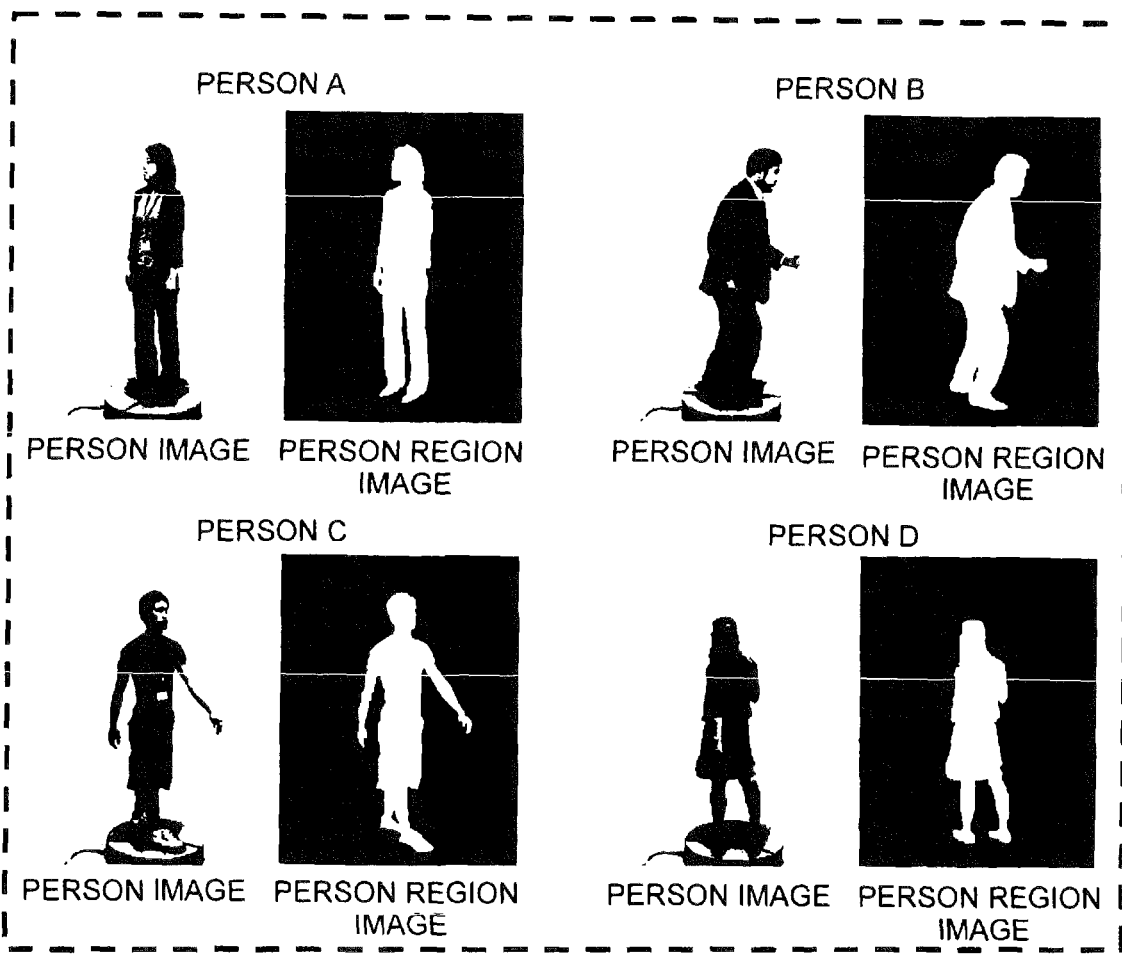
FIG. 4 It depicts a diagram illustrating person images stored in a person image storage means and person region images corresponding to the person images by way of example.

An exemplary embodiment according to the present invention will be described below with reference to the drawings.

FIG. 1 is a block diagram illustrating an exemplary structure of a training data generating device according to the present invention. A training data generating device 10 according to the present invention generates training data for machine-learning a crowd state in an image. Specifically, the training data generating device 10 creates a plurality of pairs of local image of a crowd state and training label corresponding to the local image. Herein, "local" indicates being smaller than a region of an image (image acquired by an image acquisition device 3 (see FIG. 7) described below) to be recognized for a crowd state. Then, a local image of a crowd state denotes a collection of basic sites (which will be denoted as reference sites below) of persons configuring a crowd in such a region. According to the present exemplary embodiment, the description will be made assuming that the head is used as a reference site, but other than the head may be used as a reference site. A local image of a crowd state will be denoted as crowd patch. A crowd patch may indicate therein sites of a person other than the reference site (the head in the present example).

The training data generating device 10 includes a data processing device 1 operating under program control, and a storage device 2 for storing information therein.

The storage device 2 includes a background image storage means 21, a learning local image information storage means 22, a crowd state control designation storage means 23, a person state control designation storage means 24, a person image storage means 25, and a person region image storage means 26.

The background image storage means 21 stores a plurality of background images (a group of background images) used as the background in a crowd patch. The background image does not include a person. An image of an actual place where an image to be recognized for a crowd state is shot may be used as a background image. A background image generated by use of CG (Computer Graphics) or the like may be used.

The learning local image information storage means 22 stores a size of a crowd patch (local image of a crowd state used for machine learning), and a size of the reference site of a person for the crowd patch. For example, a size of a crowd patch is assumed at h pixels in height and w pixels in width. A height size of the reference site (the head in the present example) of a person configuring a crowd shot in the crowd patch is assumed at $1/\alpha$ times of the height size of the crowd patch, or at $h/\alpha$ pixels. In this case, h pixels in height and w pixels in width are stored as the size of the crowd patch in the learning local image information storage means 22. $h/\alpha$ pixels in height is stored as the size of the reference site of a person in the learning local image information storage means 22. There is assumed herein the example in which the height size is stored as the size of the reference site, but the size of the reference site to be stored is not limited to the height size. For example, it is assumed that a width size of the reference site of a person is defined at $1/\alpha$ times of the width size of the crowd patch or $w/\alpha$ pixels. In this case, h pixels in height and w pixels in width are stored as the size of the crowd patch in the learning local image information storage means 22, and $w/\alpha$ pixels in width may be stored as the size of the reference site of a person in the learning local image information storage means 22. In actual use, a size of the reference site of a person may employ either the height size or the width size. A relationship between the size of the crowd patch and the size of the reference site of a person has only to be known, and a diagonal size or the like may be used.

Herein, the size of the reference site of a person is a size by which a person whose reference site is shot as large as the size in a crowd patch is identified as a human being. For example, when the reference site of a person is shot to be remarkably large in a crowd patch or shot to be remarkably small, the person configures the crowd but is simply regarded as background.

The crowd state control designation storage means 23 stores designation information on person states for people (which will be denoted as people state control designation below) when synthesizing a plurality of person images in a crowd patch. The people state control designation is previously defined by an operator of the training data generating device 10 and is stored in the crowd state control designation storage means 23. The people state control designation is defined per item such as item "arrangement of person" for a people arrangement relationship such as overlapped persons or positional deviation when synthesizing a plurality of person images, item "direction of person" on orientations of persons, or item "number of persons" for the number of persons or density. Items with the defined people state control designation are not limited thereto. FIG. 2 is a schematic diagram illustrating exemplary information stored in the crowd state control designation storage means 23. FIG. 2 illustrates the people state control designation defined for "arrangement of person," "direction of person," and "number of persons."

The forms of the people state control designation include "predetermined state," "random," and "predetermined rule."

"Predetermined state" is a designated form to designate a specific state for a corresponding item. In the example illustrated in FIG. 2, "three persons" defined for the item "number of persons" corresponds to "predetermined state."

In this example, "number of persons" is specifically designated as "three persons." As other example of "predetermined state," "all people in right direction" may be designated for the item "direction of person," for example.

"Random" indicates that a state may be arbitrarily defined for a corresponding item. In the example illustrated in FIG. 2, the people state control designation "random" is defined for "arrangement of person" and "direction of person."

"Predetermined rule" is a designation form indicating that a state for a corresponding item may be defined within a range meeting an operator-designated rule. For example, when a rule that "persons are arranged in overlap of 50%" is defined for the item "arrangement of person," the arrangement of person is designated to define at least a state of persons meeting the rule. For example, when a rule that "persons arranged on the right side relative to the center of a crowd patch face rightward and persons arranged on the left side relative to the center face leftward" is defined for "direction of person," the direction of person is designated to define at least a state of persons meeting the rule.

The crowd state control designation storage means 23 stores the presence of a designated training label per item. In the example illustrated in FIG. 2, "○" indicates information on the presence of a designated training label and "x" indicates information on the absence of a designated training label. This point is the same as in FIG. 3 described later.

The operator selects one or more items with a designated training label from among the items with the defined people state control designation. Further, the operator defines the people state control designation for each item irrespective of whether an item is to be designated with a training label. In the example illustrated in FIG. 2, the people state control designation (the designation of random in this example) is defined for the items "arrangement of person" and "direction of person" without a designated training label. The operator assumes a form of the people state control designation as "predetermined state" for items with a designated training label. In the example illustrated in FIG. 2, a specific state of "three persons" is designated for the item "number of persons" with a designated training label. The crowd state control designation storage means 23 stores therein the people state control designation and the presence of a designated training label defined by the operator per item.

FIG. 2 illustrates the items "arrangement of person," "direction of person," and "number of persons" by way of example, but items for which the operator defines the people state control designation and the presence of a designated training label are not limited thereto. According to the present exemplary embodiment, the description will be made assuming that the crowd state control designation storage means 23 stores therein the people state control designation and the presence of a designated training label defined by the operator for at least the items "arrangement of person," "direction of person," and "number of persons."

The person state control designation storage means 24 stores information to designate a state of each person (which will be denoted as individual person state control designation below) when a plurality of person images are synthesized within a crowd patch. While the "people state control designation" designates a person state for people, the "individual person state control designation" designates a state of an individual person belonging to a group of persons. The individual person state control designation is previously defined by the operator of the training data generating device 10, and is stored in the person state control designation storage means 24. The individual person state control designation is defined per item such as "shooting angle of person," "illumination to person," "posture of person," "clothes of person," "body shape of person," "hairstyle of person" or "person size when synthesized with crowd patch." Items with the defined individual person state control designation are not limited to the items. FIG. 3 is a schematic diagram illustrating exemplary information stored in the person state control designation storage means 24. FIG. 3 illustrates the individual person state control designation defined for the items "shooting angle of person," "illumination to person," and "posture of person."

The forms of the individual person state control designation are "predetermined state," "random," and "predetermined rule" similarly to the people state control designation.

As described for the people state control designation, "predetermined state" is a designation form to designate a specific state for a corresponding item. In the example illustrated in FIG. 3, "walking" defined for the item "posture of person" corresponds to "predetermined state." In this example, "posture of person" is specifically designated as walking posture.

As described for the people state control designation, "random" indicates that a state may be arbitrarily defined for a corresponding item. In the example illustrated in FIG. 3, the individual person state control designation "random" is defined for "illumination to person."

As described for the people state control designation, "predetermined rule" is a designation form for designating to define a state of a corresponding item within a range meeting an operator-designated rule. In the example illustrated in FIG. 3, the predetermined rule is defined for "shooting angle of person." In this example, it is designated to calculate a shooting angle of a person and to define a person state depending on the shooting angle by use of an equation based on the camera parameters from the person arrangement on synthesis. For example, when a rule that "a person size on synthesis is determined based on a person arrangement on synthesis and the size of the reference site stored in the learning local image information storage means 22" is defined for "person size when synthesized with crowd patch," a size of the person is to be defined so as to meet at least the rule.

The person state control designation storage means 24 also stores the presence of a designated training label per item.

The operator may select one or more items with a designated training label for not only the items with the defined people state control designation but also the items with the defined individual person state control designation. Also in this case, the operator defines the individual person state control designation for each item irrespective of whether an item is to be designated with a training label. In the example illustrated in FIG. 3, the individual person state control designation is defined for the items "shooting angle of person" and "illumination to person" without a designated training label. The operator assumes a form of the individual person state control designation as "predetermined state" for an item with a designated training label. In the example illustrated in FIG. 3, the items "posture of person" with a designated training label is specifically designated as a state of walking. The person state control designation storage means 24 stores therein the individual person state control designations and the presence of a designated training label defined by the user per item.

The operator may not designate a training label for all the items with the defined individual person state control designation. As described above, the operator defines one or more items as items with a designated training label for the items with the defined people state control designation.

According to the present exemplary embodiment, the description will be made assuming that the person state control designation storage means 24 stores the operator-defined individual person state control designation and the presence of a designated training label for at least the items "shooting angle of person," "illumination to person," "posture of person," "clothes of person," "body shape of person," "hairstyle of person," and "person size when synthesized with crowd patch."

The contents of the people state control designation defined for an item with a designated training label are a training label corresponding to a crowd patch generated according to the information stored in the crowd state control designation storage means 23. Similarly, the contents of the individual person state control designation defined for an item with a designated training label are a training label corresponding to a crowd patch generated according to the information stored in the person state control designation storage means 24. The training label based on the people state control designation is a main training label, and the training label based on the individual person state control designation is a supplementary training label for the training label.

Specifically, the data processing device 1 (see FIG. 1) determines person states, and generates a crowd patch in which the persons are synthesized according to the people state control designation of each item stored in the crowd state control designation storage means 23 and the individual person state control designation of each item stored in the person state control designation storage means 24. The data processing device 1 defines the contents of the people state control designation and the individual person state control designation defined for an item with a designated training label as a training label for the crowd patch. For example, it is assumed that the data processing device 1 generates a crowd patch according to the people state control designation and the individual person state control designation illustrated in FIG. 2 and FIG. 3. In this case, three walking persons are shot in the crowd patch. The data processing device 1 defines a training label of "three persons, walking" as the training label for the crowd patch.

The item "person size when synthesized with crowd patch" is to be stored in the person state control designation storage means 24. When a person identified as a human being is synthesized in a crowd patch, the size of the reference site of a person stored in the learning local image information storage means 22 may be designated or random may be designated as the individual person state control designation of "person size when synthesized with crowd patch," for example. As a result of the designation of random, if a person state is temporarily determined at the size of the reference site largely different from the size of the reference site of a person stored in the learning local image information storage means 22, the temporary determination of a person state may be made again. When a person to be the background is synthesized in a crowd patch, a size largely different from the size of the reference site of a person stored in the learning local image information storage means 22 may be designated or random may be designated as the individual person state control designation of "person size when synthesized with crowd patch," for example. As a result of the designation of random, if a state of a person not corresponding to the background is temporarily determined, the temporary determination of a person state may be made again.

As described below, according to the present exemplary embodiment, the data processing device 1 determines a state of a person to be identified as a human being (which may be denoted as foreground person below) and determines a state of a background person. The people state control designation and the individual person state control designation for determining a foreground person state as well as the people state control designation and the individual person state control designation for determining a background person state may be separately defined by the operator. In this case, the crowd state control designation storage means 23 stores therein the people state control designation for determining a foreground person state and the people state control designation for determining a background person state. The person state control designation storage means 24 stores therein the individual person state control designation for determining a foreground person state and the individual person state control designation for determining a background person state. The people state control designation and the individual person state control designation may not be divided for determining a foreground person state and for determining a background person state.

The person image storage means 25 stores a plurality of person images (a group of person images) added with information on person states such as direction of person, shooting angle of person, illumination to person, posture of person, clothes, body shape and hairstyle for person image. That is, the data processing device 1 can read a person image matching with the determined state from the person image storage means 25.

The person region image storage means 26 stores a group of person region images corresponding to the group of person images stored in the person image storage means 25. A person region image is an image indicating the region of a person in a person image stored in the person image storage means 25. FIG. 4 is a diagram illustrating person images stored in the person image storage means 25 and person region images corresponding to the person images by way of example. FIG. 4 illustrates four pairs of person image and person region image by way of example. A person region image may be an image in which the region of a person shot in a person image is expressed in a single color (white in the example illustrated in FIG. 4) and the region of other than the person is expressed in another single color (black in the example illustrated in FIG. 4). A person region image is not limited to the example. A person region image may be an image capable of specifying the region of a person in a person image.

A person region image is used for cropping only a person (or cropping only the region of a person) from a corresponding person image.

There may be configured not such that a group of various person images is previously prepared and stored in the person image storage means 25 but such that the data processing device 1 includes a person image generation means (not illustrated) for generating a person image matching with a determined person state by CG or the like.

The data processing device 1 includes a background extraction means 11, a person state determination means 15, a crowd state image synthesis means 14 and a control means 16.

The background extraction means 11 selects a background image from the group of background images stored in the background image storage means 21. The background extraction means 11 calculates an aspect ratio of the crowd patch size stored in the learning local image information storage means 22. The background extraction means 11 temporarily extracts a background at a proper position and a proper size to meet the aspect ratio from the selected background image. Further, the background extraction means 11 enlarges or downsizes the temporarily-extracted background to match with the crowd patch size stored in the learning local image information storage means 22. In this way, to enlarge or downsize a region extracted from an image to match with a crowd patch size may be denoted as to normalize.

When the background extraction means 11 temporarily extracts a background at a proper position and a proper size, a region at a random position and a random size may be extracted to meet the aspect ratio. Assuming that the size of the reference site of a person at each position in the image is known, the background extraction means 11 may find a size of the crowd patch enlarged or downsized at an enlargement rate or downsizing rate at which the size of the reference site of a person stored in the learning local image information storage means 22 is enlarged or downsized according to the size of the reference site known at each position in the image. The background extraction means 11 may then extract a region with the size found for a position in the image. The method with which the background extraction means 11 temporarily extracts a region from a selected background image may be other method.

The person state determination means 15 determines a final person state based on the conditions for the size of the reference site of a person for the crowd patch size and how the reference site is expressed while temporarily determining a person state based on the people state control designation stored in the crowd state control designation storage means 23 and the individual person state control designation stored in the person state control designation storage means 24.

Herein, when a person state meeting the people state control designation and the individual person state control designation is determined, the designation "random" may be possible in the designations, and thus a proper person state may not be acquired. In this case, a person state meeting the people state control designation and the individual person state control designation is determined again. When a proper person state is acquired, the person state is finally determined. In this way, a person state may be determined again, and thus the expression "temporary determination" may be used.

According to the present exemplary embodiment, the person state determination means determines a foreground person state and determines a background person state. At this time, when determining whether a temporarily-determined foreground person state is proper, the person state determination means 15 makes the determination based on whether a size of the reference site comparable with the size of the reference site of a person for the crowd patch size is acquired or how the reference site is expressed. When determining whether a temporarily-determined background person state is proper, the person state determination means 15 makes the determination based on whether a size of the reference site largely different from the size of the reference site of a person for the crowd patch size is acquired or how the reference site is expressed.

The person state determination means 15 will be described below in more detail. The person state determination means 15 includes a background person state determination means 12 and a foreground person state determination means 13.

The background person state determination means 12 defines arrangement of person, direction of person, number of persons, shooting angle of person, illumination to person, posture of person, clothes of person, body shape of person, hairstyle of person, person size when synthesized with crowd patch, and the like, and temporarily determines a state of a person corresponding to the background according to the people state control designation stored in the crowd state control designation storage means 23 and the individual person state control designation stored in the person state control designation storage means 24. The background person state determination means 12 determines whether the temporarily-determined person state meets the condition of the background person state, and if the condition of the background person state is not met, makes the temporary determination of the person state again. If the temporarily-determined person state meets the condition, the background person state determination means 12 finally determines the temporarily-determined person state as the state of the person corresponding to the background.

The condition of the background person state corresponds to the fact that a person is arranged such that the reference site of the person is not within a crowd patch or the fact that a size of the reference site of a person when synthesized is remarkably larger than the size of the reference site stored in the learning local image information storage means 22, or remarkably smaller than that, for example. Under the condition, a state of a person corresponding to the background is finally determined based on the size of the reference site of the person relative to the crowd patch size or how the reference site is expressed. The conditions listed herein are exemplary, and other conditions may be employed for the conditions of the background person state.

The fact that the reference site of a person is within a crowd patch indicates a state in which more than a predetermined rate of the region expressing the reference site of the person therein is shot in a crowd patch. Conversely, the fact that the reference site of a person is not within a crowd patch indicates a state in which less than a predetermined rate of the region expressing the reference site of the person therein is shot within a crowd patch. For example, it is assumed that the predetermined rate is previously defined at 80%. In this case, for example, if 85% of the region expressing the reference site is shot within a crowd patch, it can be said that the reference site of the person is within a crowd patch. For example, if only 20% of the region expressing the reference site is shot in a crowd patch, it can be said that the reference site of the person is not within a crowd patch. 80% is an exemplary rate, and a value other than 80% may be defined as the predetermined rate.

According to the present exemplary embodiment, a first threshold indicating a size larger than the size of the reference site stored in the learning local image information storage means 22 and a second threshold indicating a size smaller than the size of the reference site stored in the learning local image information storage means 22 are previously defined. The fact that the size of the reference site of a person when synthesized is as large as the size of the reference site stored in the learning local image information storage means 22 indicates that the size of the reference site of a person when synthesized is equal to or larger than the second threshold, and equal to or less than the first threshold. The fact that the size of the reference site of a person when synthesized is much larger than the size of the reference site stored in the learning local image information storage means 22 indicates that the size of the reference site of a person when synthesized is larger than the first threshold. The fact that the size of the reference site of a person when synthesized is much smaller than the size of the reference site stored in the learning local image information storage means 22 indicates that the size of the reference site of a person when synthesized is less than the second threshold.

Figure 5:
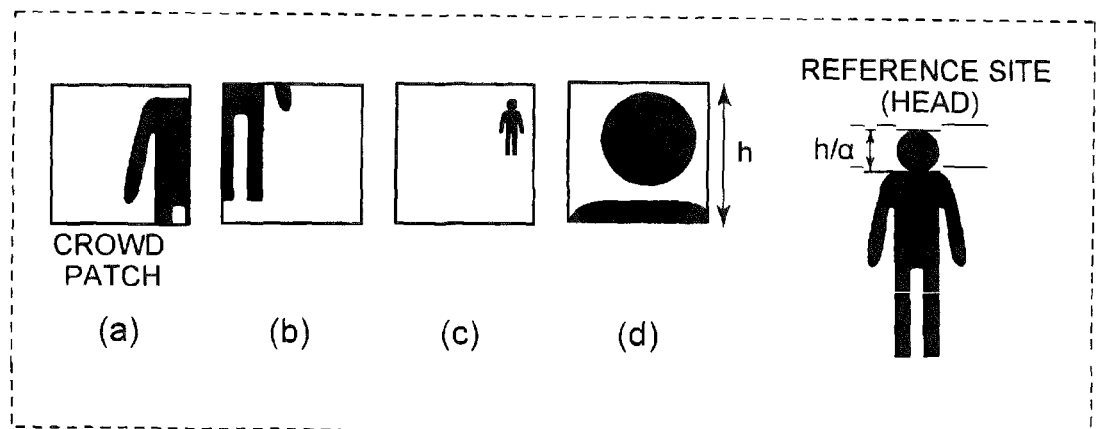
FIG. 5 It depicts schematic diagrams illustrating examples meeting a condition of a background person state.

FIGS. 5(*a*) to 5(*d*) are the schematic diagrams illustrating the examples in which the condition of the background person state is met. In this example, it is assumed that the height size of the reference site (the head in this example) of a person is stored as $1/\alpha$ times of the height size of h pixels of a crowd patch (or $h/\alpha$ pixels) in the learning local image information storage means 22. The person states illustrated in FIGS. 5(*a*) and 5(*b*) are in an arrangement state in which the reference site of the person is not found in the crowd patch, and thus the condition of the background person state is met. The person state illustrated in FIG. 5(*c*) is that the size of the reference site is much smaller than the defined size of the reference site, and thus the condition of the background person state is met. The person state illustrated in FIG. 5(*d*) is that the size of the reference site is much larger than the defined size of the reference site, and thus the condition of the background person state is met.

The foreground person state determination means 13 defines arrangement of person, direction of person, number of persons, shooting angle of person, illumination to person, posture of person, clothes of person, body shape of person, hairstyle of person, person size when synthesized with crowd patch, and the like, and temporarily determines a state of a person corresponding to the foreground according to the people state control designation stored in the crowd state control designation storage means 23 and the individual person state control designation stored in the person state control designation storage means 24. The foreground person state determination means 13 then determines whether the temporarily-determined person state meets the condition of the foreground person state, and if the condition of the foreground person state is not met, makes the temporary determination of the person state again. Further, if the temporarily-determined person state meets the condition, the foreground person state determination means 13 finally determines the temporarily-determined person state as the state of the person corresponding to the foreground.

The condition of the foreground person state is, for example, that the reference site of a person is arranged to be within a crowd patch and the size of the reference site of a person when synthesized is as large as the size of the reference site stored in the learning local image information storage means 22. Under the condition, a state of the person corresponding to the foreground is finally determined based on the size of the reference site of the person relative to the crowd patch size or how the reference site is expressed. The conditions listed herein are exemplary, and other conditions may be employed as the condition of the foreground person state.

Figure 6:
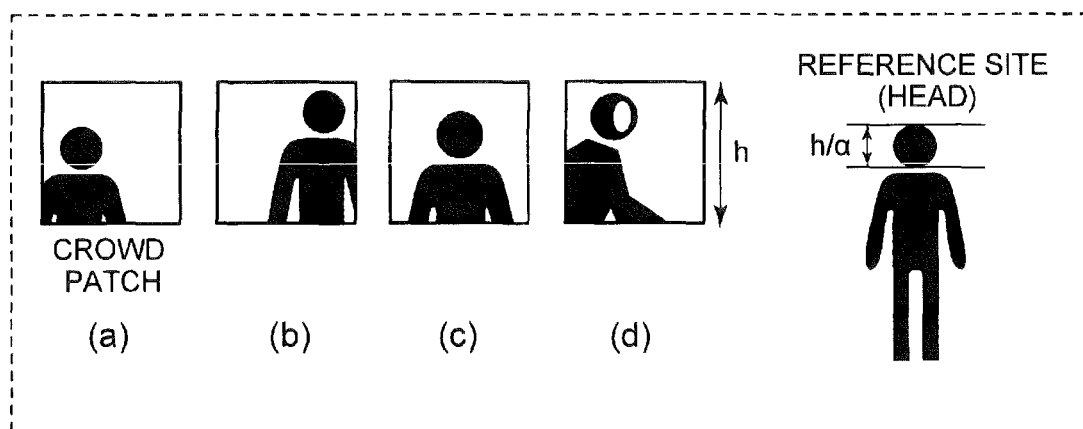
FIG. 6 It depicts schematic diagrams illustrating examples meeting a condition of a foreground person state.

FIGS. 6(*a*) to 6(*d*) are the schematic diagrams illustrating the examples in which the condition of the foreground person state is met. As described with reference to FIGS. 5(*a*) to 5(*d*), the height size of the reference site (the head in this example) of a person is assumed as $1/\alpha$ times of the height size of h pixels of a crowd patch (or $h/\alpha$ pixels) in the learning local image information storage means 22. Any person state illustrated in FIGS. 6(*a*) to 6(*d*) is such that the reference site of the person is within the crowd patch and the size of the reference site is as large as the size of the reference site stored in the learning local image information storage means 22. Therefore, any person state illustrated in FIGS. 6(*a*) to 6(*d*) meets the condition of the foreground person state.

As described above, the people state control designation and the individual person state control designation for determining a foreground person state and the people state control designation and the individual person state control designation for determining a background person state may be separately defined by the operator. In this case, the background person state determination means 12 may temporarily determine a person state according to the people state control designation and the individual person state control designation for determining a background person state. The foreground person state determination means 13 may then temporarily determine a person state according to the people state control designation and the individual person state control designation for determining a foreground person state. As described above, when the people state control designation and the individual person state control designation are separately defined for determining a foreground person state and for determining a background person state, the number of foreground persons and the number of background persons can be changed.

The crowd state image synthesis means 14 reads a person image meeting the person state (such as direction of person, number of persons, shooting angle of person, illumination to person, posture of person, clothes of person, body shape of person, and hairstyle of person) finally determined by the background person state determination means 12 from the person image storage means 25, and further reads a person region image corresponding to the person image from the person region image storage means 26. The crowd state image synthesis means 14 then crops the image of only the person from the person image by use of the person region image (or crops only the person region). Similarly, the crowd state image synthesis means 14 reads a person image meeting the person state finally determined by the foreground person state determination means 13 from the person image storage means 25, and further reads a person region image corresponding to the person image from the person region image storage means 26. The crowd state image synthesis means 14 then crops the image of only the person from the person image by use of the person region image.

The crowd state image synthesis means 14 synthesizes the image of only the person cropped as described above with the background image. At this time, the crowd state image synthesis means 14 synthesizes the image of only the person cropped based on the person state finally determined by the background person state determination means 12 with the background image according to "arrangement of person" and "person size when synthesized with crowd patch" determined by the background person state determination means 12. Further, the crowd state image synthesis means 14 synthesizes the image of only the person cropped based on the person state finally determined by the foreground person state determination means 13 with the background image according to "arrangement of person" and "person size when synthesized with crowd patch" determined by the foreground person state determination means 13. Herein, the background image is an image normalized by the background extraction means 11. The synthesis result is a crowd patch.

When synthesizing the images of only persons with the background image, the crowd state image synthesis means 14 sequentially overlaps and synthesizes the images from the image of a person corresponding to the farthest arrangement position from the camera. For example, when the upper part of the image is farther from the camera, the crowd state image synthesis means 14 sequentially overlaps and synthesizes from the image of the person at the upper part of the screen. When information on camera calibration is given, the crowd state image synthesis means 14 overlaps and synthesizes the images of persons from the farthest image from the camera in consideration of the 3D positions of the images of persons.

The above example has been described assuming that the crowd state image synthesis means 14 crops the image of only a person from a person image by use of a person region image and synthesizes the image of only a person with the background image. The crowd state image synthesis means 14 may divide a person image read from the person image storage means 25 into the region of a person and the region of other than the person based on a person region image corresponding to the person image, may weight the region of the person and the region of other than the person, and may blend and synthesize the person image based on the weights. In this case, the weight on the region of the person is heavier than the region of other than the person. The weights may be changed in the regions.

As described above, the data processing device 1 may include the person image generation means (not illustrated) for generating a person image matching with a designated person state by CG or the like. In this case, the person image generation means (not illustrated) generates a person image matching with a person state determined by the background person state determination means 12 or a person state determined by the foreground person state determination means 13, and the crowd state image synthesis means 14 may synthesize the person image thereby to generate a crowd patch.

The crowd state image synthesis means 14 reads training labels from the crowd state control designation storage means 23 and the person state control designation storage means 24 when generating a crowd patch. That is, the crowd state image synthesis means 14 reads the contents of the people state control designation of an item with a designated training label from the crowd state control designation storage means 23, and reads the contents of the individual person state control designation of an item with a designated training label from the person state control designation storage means 24. The crowd state image synthesis means 14 then outputs a pair of crowd path and training label. The crowd patch and the training label are used as training data of machine learning for recognizing a crowd state in the image.

The control means 16 causes the background extraction means 11, the person state determination means 15 (specifically, the background person state determination means 12 and the foreground person state determination means 13) and the crowd state image synthesis means 14 to repeatedly perform a series of processings. Consequently, the data processing device 1 outputs a large number of pairs of crowd patch and training label.

When changing the person state designation or the training label, the operator resets the people state control designation, the individual person state control designation, and the presence of a designated training label so that the data processing device 1 outputs a large number of pairs of crowd patch and training label depending on the setting. Therefore, the operator can acquire a large amount of desired training data.

Figure 7:
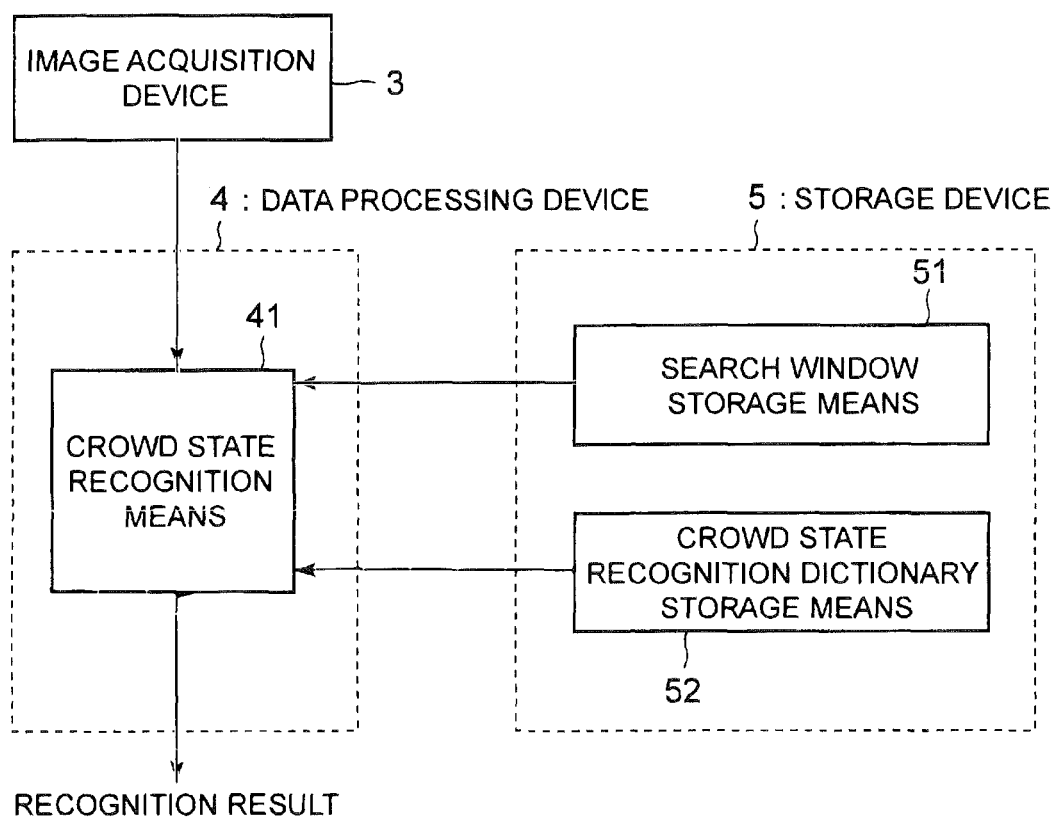
FIG. 7 It depicts a block diagram illustrating an exemplary structure of a crowd state recognition device according to the present invention.

FIG. 7 is a block diagram illustrating an exemplary structure of a crowd state recognition device according to the present invention. A crowd state recognition device 30 according to the present invention recognizes a crowd state in a given image. The crowd state recognition device 30 includes the image acquisition device 3, a data processing device 4 operating under program control, and a storage device 5 for storing information therein.

The image acquisition device 3 is a camera for acquiring an image to be recognized for a crowd state.

The storage device 5 includes a search window storage means 51 and a crowd state recognition dictionary storage means 52.

The search window storage means 51 stores a group of rectangular regions indicating portions to be recognized for a crowd state on an image. The rectangular region may be called search window. The group of rectangular regions may be set by defining a changed size of a crowd patch depending on a position on an image based on the camera parameters indicating position, posture, focal distance and lens distortion of the image acquisition device 3 and the size of the reference site corresponding to the crowd patch size (the size of the reference site stored in the learning local image information storage means 22). For example, the size of the reference site of a person shot in an image can be derived from the camera parameters. The size of the crowd patch is enlarged or downsized at an enlargement rate or downsizing rate when enlarging or downsizing the size of the reference site of a person stored in the learning local image information storage means 22 according to the size of the reference site, thereby setting the size of the rectangular region. The group of rectangular regions may be set to cover the positions on the image. The group of rectangular regions may be freely set not limited to the method. Further, the group of rectangular regions may be set to be overlapped The crowd state recognition dictionary storage means 52 stores a dictionary of a discriminator learned by training data (a large number of pairs of crowd patch and training label) generated by the training data generating device 10 illustrated in FIG. 1. The discriminator is an algorithm for recognizing a crowd state, and the dictionary of the discriminator is used for performing a crowd state recognition processing according to the algorithm. The dictionary of the discriminator stored in the crowd state recognition dictionary storage means 52 is acquired by machine learning by use of a large number of pairs of crowd patch and training label generated by the training data generating device 10, for example. The machine learning may be well-known machine learning.

The data processing device 4 includes a crowd state recognition means 41.

The crowd state recognition means 41 extracts local region images corresponding to the group of rectangular regions stored in the search window storage means 51 from an image acquired by the image acquisition device 3, and normalizes the extracted local region images to match with the crowd patch size. The crowd state recognition means 41 then recognizes (determines) crowd states in the normalized local region images by use of the dictionary of the discriminator stored in the crowd state recognition dictionary storage means 52 according to the recognition algorithm (or the discriminator).

The training data generating device 10 illustrated in FIG. 1 can generate a large amount of training data (pairs of crowd patch and training label) intended by the operator. The crowd state recognition means 41 recognizes a crowd state in a local region image by use of the dictionary of the discriminator acquired as a result of machine learning using such training data. Therefore, the crowd state recognition device 30 can recognize a variety of crowd states.

Figure 8:
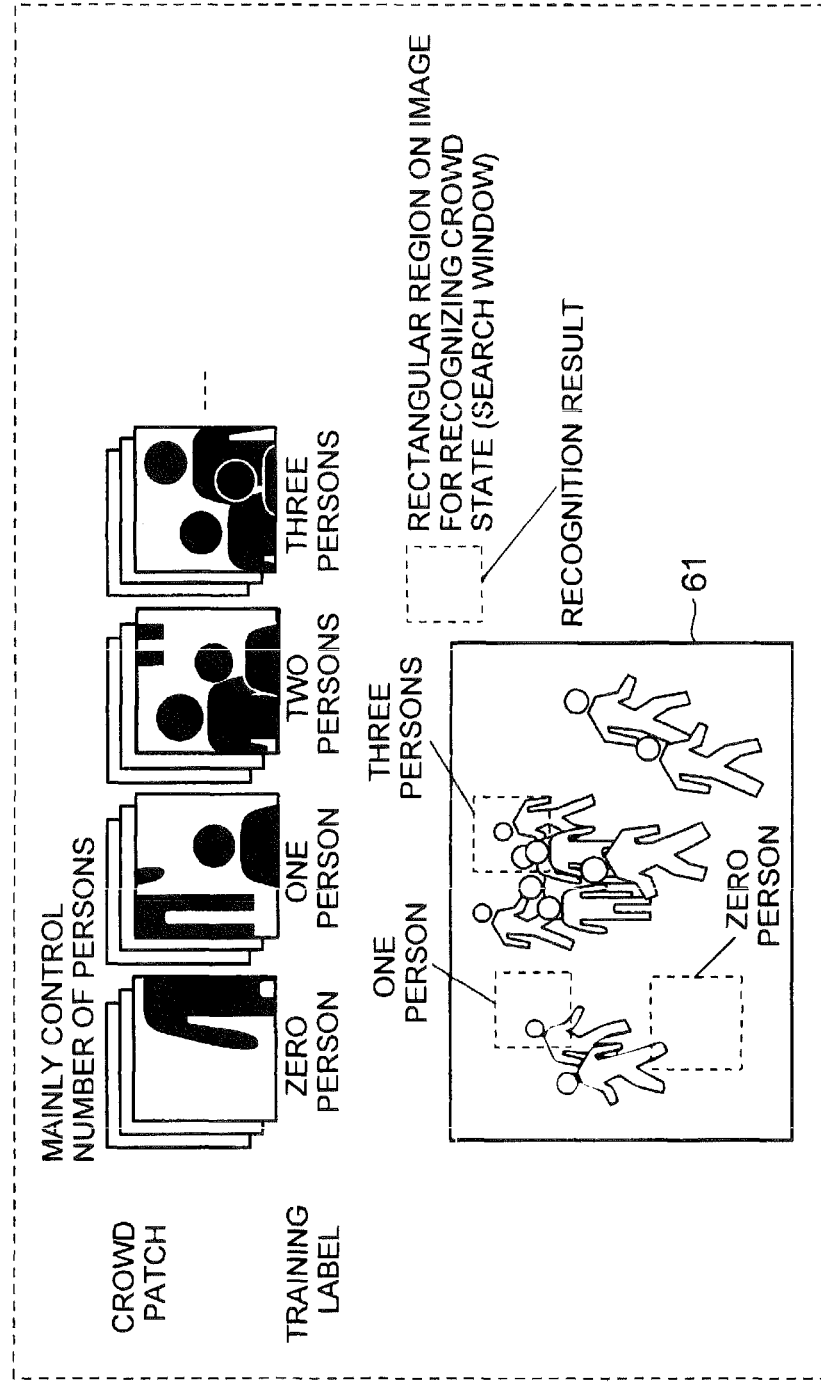
FIG. 8 It depicts a schematic diagram illustrating how to recognize a degree of congestion (the number of persons) by way of example.

FIG. 8 is a schematic diagram illustrating how to recognize a degree of congestion (the number of persons) as a crowd state in an image by way of example. For example, it is assumed that the operator of the training data generating device 10 mainly controls "number of persons" in a stepwise manner and acquires large numbers of crowd patches and training labels (see the upper part of FIG. 8). It is then assumed that a dictionary of the discriminator acquired by machine learning from the training data is stored in the crowd state recognition dictionary storage means 52. In an image 61 illustrated in FIG. 8, rectangular regions form which local region images are to be exacted are indicated in broken lines. The recognition results of crowd states for the local region images extracted according to the rectangular regions are expressed corresponding to the regions in broken lines. This applies to FIG. 9 to FIG. 11 described below. Further, actual rectangular regions are basically set to cover the entire image, but only some rectangular regions are illustrated by way of example for simply illustrating recognition results. In this example, the crowd state recognition means 41 can recognize the numbers of persons (degrees of congestion) in various regions in the image 61 as illustrated in FIG. 8.

Figure 9:
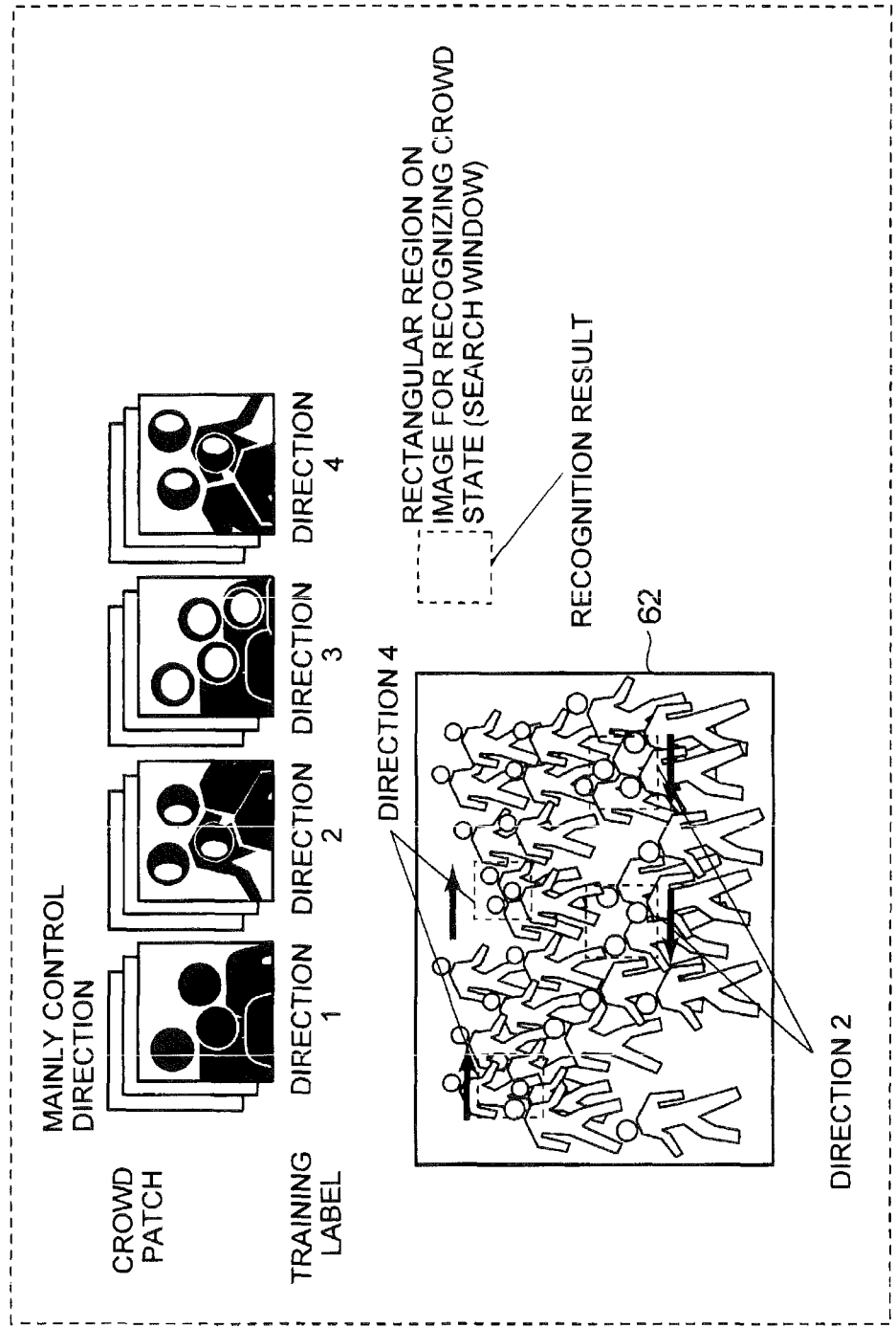
FIG. 9 It depicts a schematic diagram illustrating how to recognize a direction of a crowd by way of example.

FIG. 9 is a schematic diagram illustrating how to recognize a direction of a crowd as a crowd state in an image by way of example. For example, it is assumed that the operator of the training data generating device 10 mainly controls "direction of person" and acquires large numbers of crowd patches and training labels (see the upper part of FIG. 9). It is then assumed that a dictionary of the discriminator acquired by machine learning from the training data is stored in the crowd state recognition dictionary storage means 52. In this example, the crowd state recognition means 41 can recognize directions of crowds in various regions in an image 62 as illustrated in FIG. 9.

Figure 10:
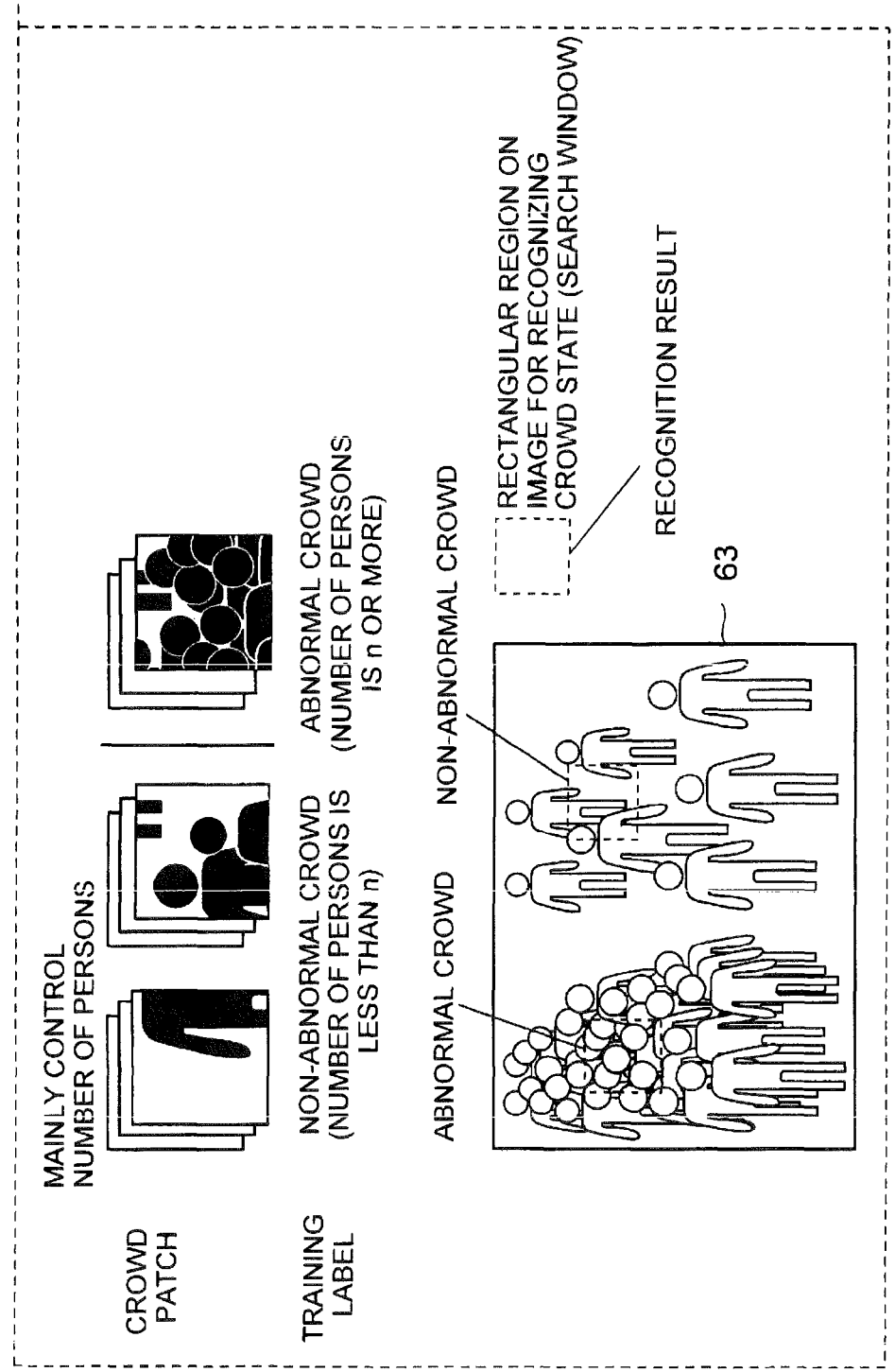
FIG. 10 It depicts a schematic diagram illustrating how to recognize a non-abnormal crowd or an abnormal crowd by way of example.

FIG. 10 is a schematic diagram illustrating how to recognize a non-abnormal crowd (non-remarkably congested crowd) or an abnormal crowd (remarkably congested crowd) as a crowd state in an image by way of example. For example, it is assumed that the operator of the training data generating device 10 mainly controls "number of persons" and acquires large numbers of crowd patches and training labels. Herein, it is assumed that a large amount of training data is acquired in two classes including when the number of persons is less than n and when the number of persons is n or more (see the upper part of FIG. 10). It is then assumed that a dictionary of the discriminator acquired by machine learning from the training data is stored in the crowd state recognition dictionary storage means 52. In this example, the crowd state recognition means 41 can recognize whether a crowd state in various regions in an image 63 is a non-abnormal crowd or an abnormal crowd as illustrated in FIG. 10.

Figure 11:
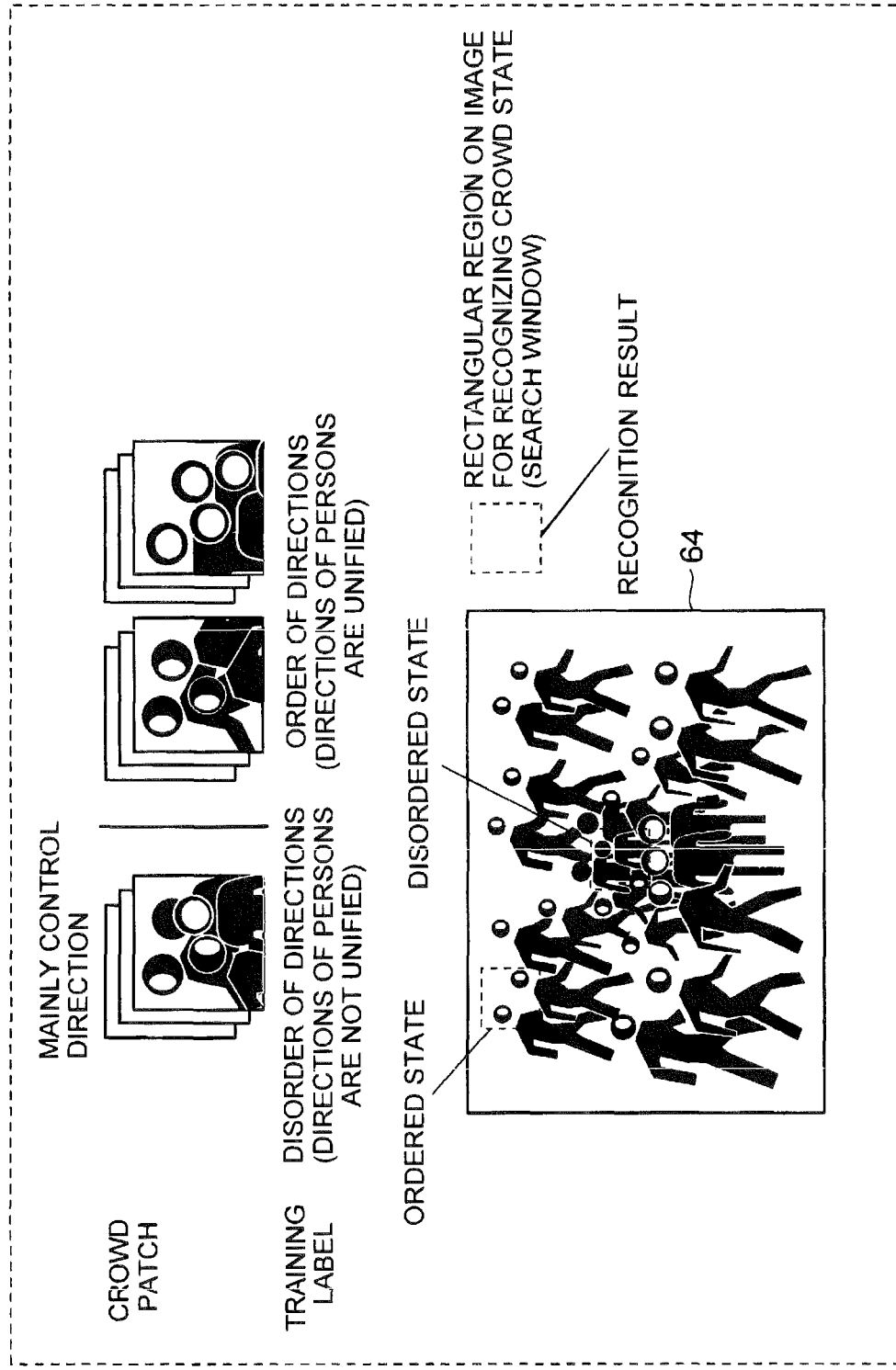
FIG. 11 It depicts a schematic diagram illustrating how to recognize a disordered state or an ordered state by way of example.

FIG. 11 is a schematic diagram illustrating how to recognize a disordered state (directions of persons are not unified) or an ordered state (directions of persons are unified) as a crowd state in an image by way of example. For example, it is assumed that the operator of the training data generating device 10 acquires a large amount of training data in two classes including when the "directions of persons" are unified and when not unified (see the upper part of FIG. 11). It is then assumed that a dictionary of the discriminator acquired by machine learning from the training data is stored in the crowd state recognition dictionary storage means 52. In this example, the crowd state recognition means 41 can recognize whether a crowd state in various regions in an image 64 is a disordered state or an ordered state as illustrated in FIG. 11.

Since a large amount of operator-intended training data can be generated, the crowd state recognition means 41 can recognize various states such as discrete state in which a crowd scatters and runs, gathering state in which a crowd gathers at a location, avoidance state in which a crowd avoids something, hanging state indicating a special crowd cluster, and line state in addition to the cases illustrated in FIG. 8 to FIG. 11.

Figure 12:
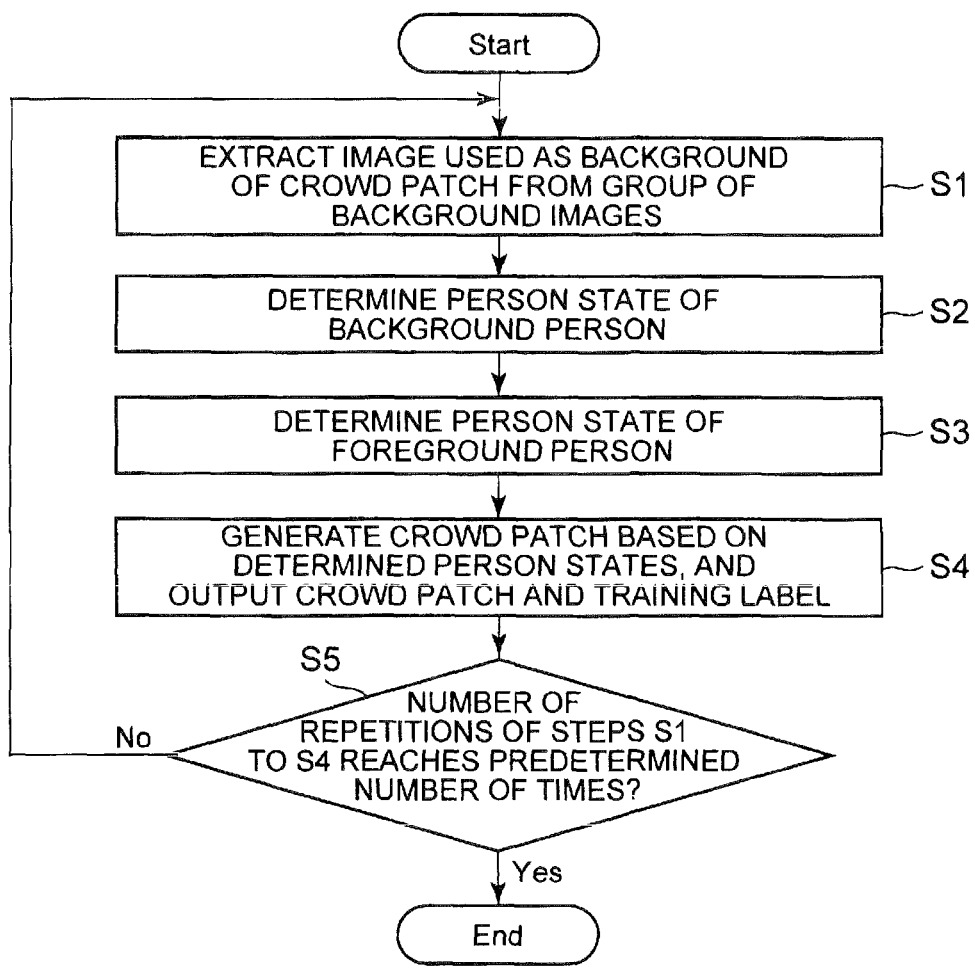
FIG. 12 It depicts a flowchart illustrating an exemplary processing progress of the training data generating device.

A processing progress of the training data generating device 10 according to the present invention will be described below. FIG. 12 is a flowchart illustrating an exemplary processing progress of the training data generating device 10.

The background extraction means 11 selects a background image from the group of background images stored in the background image storage means 21, and extracts an image used as the background of a crowd patch (step S1).

Figure 13:
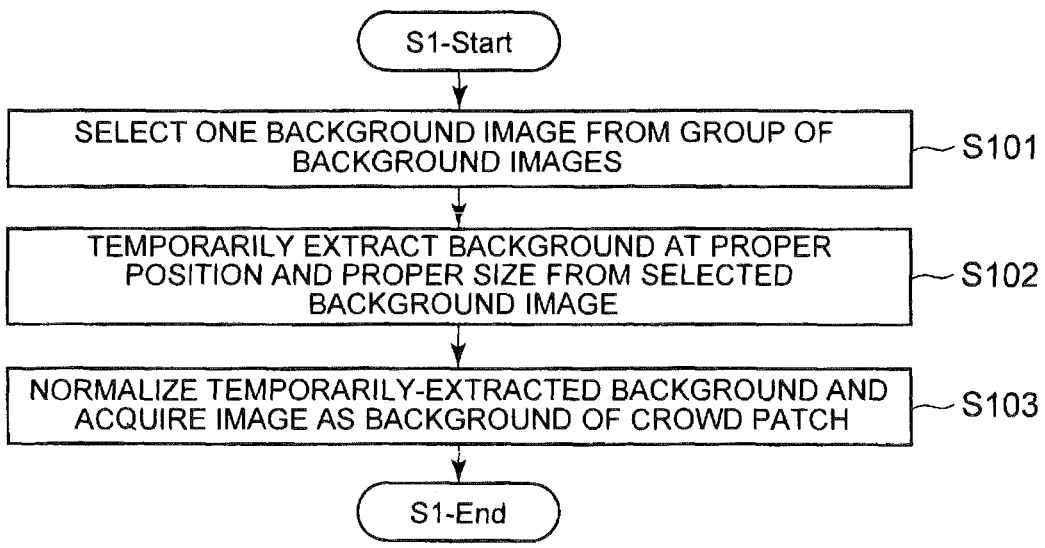
FIG. 13 It depicts a flowchart illustrating an exemplary processing progress of step S1.

FIG. 13 is a flowchart illustrating an exemplary processing progress of step S1. In step S1, the background extraction means 11 first selects one background image from the group of background images stored in the background image storage means 21 (step S101). The selection method is not particularly limited. For example, the background extraction means 11 may select any one background image from the group of background images.

The background extraction means 11 then calculates an aspect ratio of the crowd patch size stored in the learning local image information storage means 22, and temporarily extracts a background at a proper position and a proper size from the selected background image to meet the aspect ratio (step S102).

The background extraction means 11 enlarges or downsizes (or normalizes) the temporarily-extracted background image to match with the crowd patch size thereby to acquire an image as the background of the crowd patch (step S103). That is the end of step S1.

After step S1, the background person state determination means 12 determines a state of the person corresponding to the background (step S2).

Figure 14:
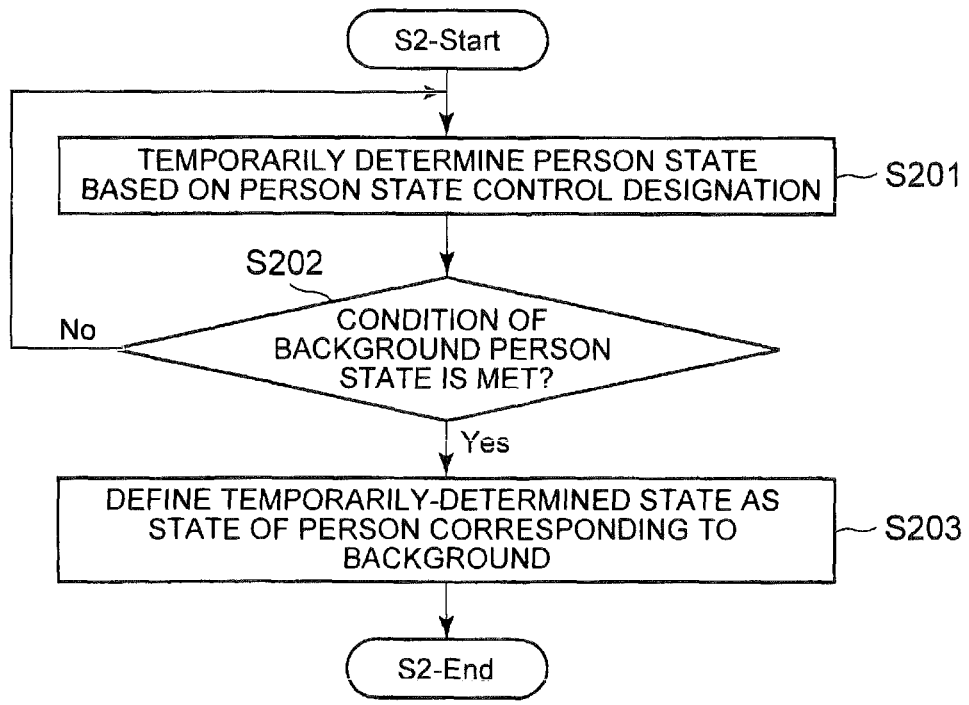
FIG. 14 It depicts a flowchart illustrating an exemplary processing progress of step S2.

FIG. 14 is a flowchart illustrating an exemplary processing progress of step S2. The background person state determination means 12 defines arrangement of person, direction of person, number of persons, shooting angle of person, illumination to person, posture of person, clothes of person, body shape of person, hairstyle of person, person size when synthesized with crowd patch, and the like, and temporarily determines a state of the person corresponding to the background according to the people state control designation stored in the crowd state control designation storage means 23 and the individual person state control designation stored in the person state control designation storage means 24 (step S201).

The background person state determination means 12 then determines whether the person state temporarily determined in step S201 meets the condition of the background person state (step S202). The condition has been described above, and thus the description thereof will be omitted herein.

The people state control designation or the individual person state control designation may include a designation of "random" or the like, and thus the state temporarily determined in step S201 may not meet the condition of the background person state. In this case (No in step S202), the background person state determination means 12 repeatedly performs the processings in and subsequent to step S201.

When the state temporarily determined in step S201 meets the condition of the background person state (Yes in step S202), the background person state determination means 12 defines the latest person state temporarily determined in step S201 as the state of the person corresponding to the background (step S203). That is the end of step S2.

After step S2, the foreground person state determination means 13 determines a state of the person corresponding to the foreground (step S3).

Figure 15:
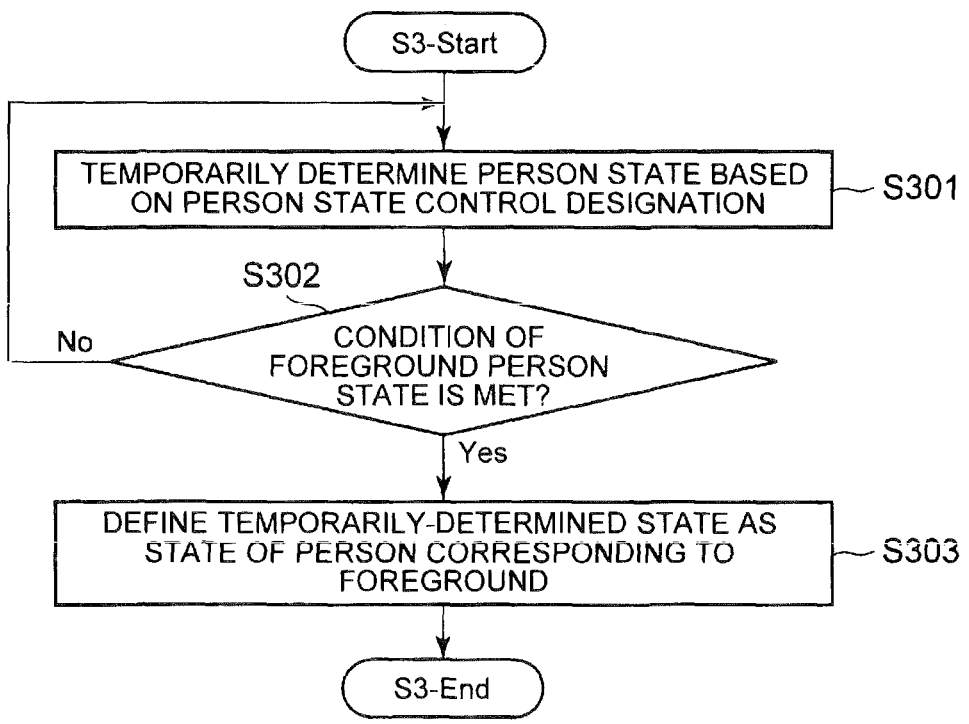
FIG. 15 It depicts a flowchart illustrating an exemplary processing progress of step S3.

FIG. 15 is a flowchart illustrating an exemplary processing progress of step S3. The foreground person state determination means 13 defines arrangement of person, direction of person, number of persons, shooting angle of person, illumination to person, posture of person, clothes of person, body shape of person, hairstyle of person, person size when synthesized with crowd patch, and the like, and temporarily determines a state of the person corresponding to the foreground according the people state control designation stored in the crowd state control designation storage means 23 and the individual person state control designation stored in the person state control designation storage means 24 (step S301).

The foreground person state determination means 13 then determines whether the person state temporarily determined in step S301 meets the condition of the foreground person state (step S302). The condition has been described above, and thus the description thereof will be omitted herein.

The people state control designation or the individual person state control designation may include a designation of "random" or the like, and thus the state temporarily determined in step S301 may not meet the condition of the foreground person state. In this case (No in step S302), the foreground person state determination means 13 repeatedly performs the processings in and subsequent to step S301.

When the state temporarily determined in step S301 meets the condition of the foreground person state (Yes in step S302), the foreground person state determination means 13 defines the latest person state temporarily determined in step S301 as the state of the person corresponding to the foreground (step S303). That is the end of step S3.

After step S3, the crowd state image synthesis means 14 generates crowd patches based on the person states determined in steps S2 and S3, reads training labels corresponding to the crowd patches, and outputs pairs of crowd patch and training labels (step S4).

Figure 16:
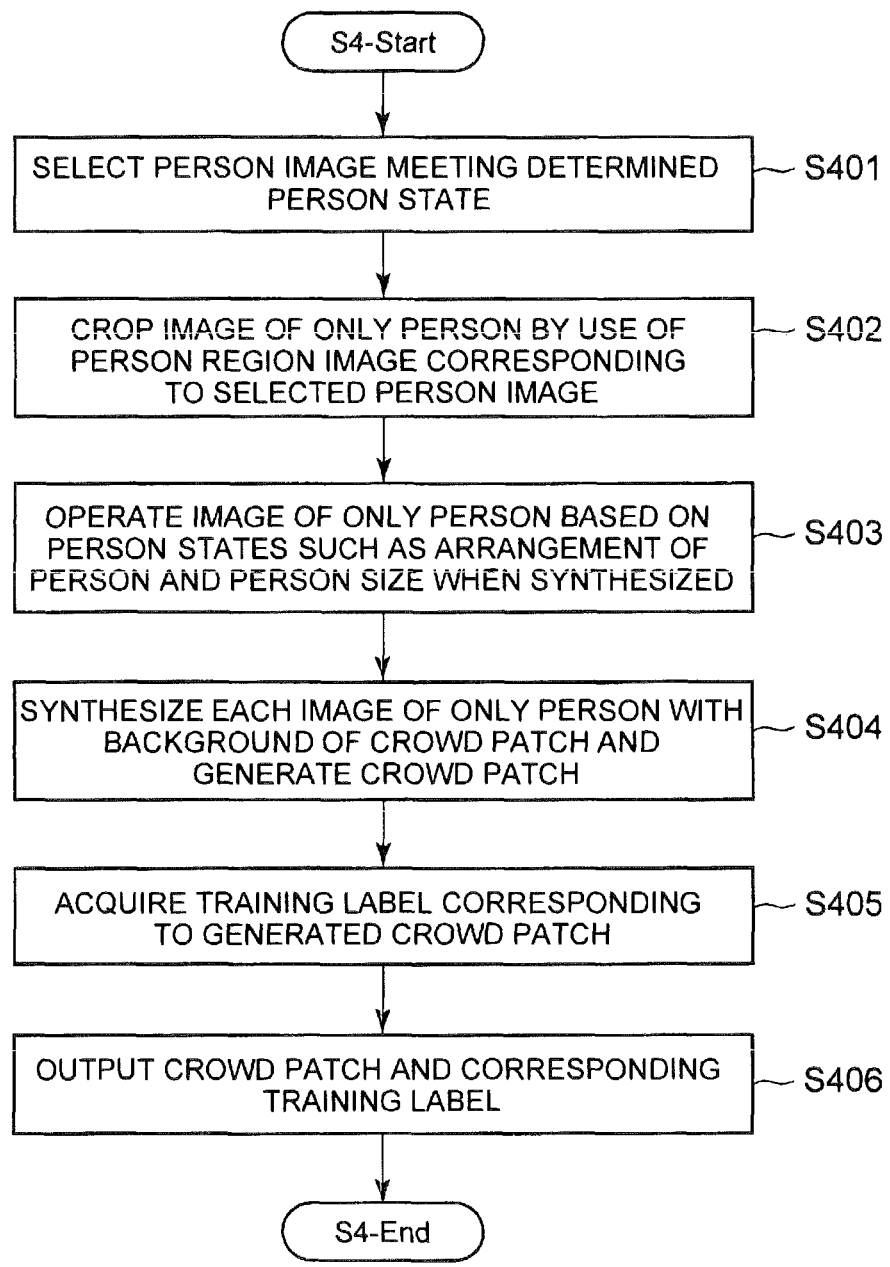
FIG. 16 It depicts a flowchart illustrating an exemplary processing progress of step S4.

FIG. 16 is a flowchart illustrating an exemplary processing progress of step S4. The crowd state image synthesis means 14 selects and reads person images meeting the person states determined in steps S2 and S3 (such as direction of person, number of persons, shooting angle of person, illumination to person, posture of person, clothes of person, body shape of person, and hairstyle of person) from the group of person images in the person image storage means 25 (step S401).

The crowd state image synthesis means 14 then reads each person region image corresponding to each person image selected in step S401 from the person region image storage means 26. The crowd state image synthesis means 14 crops the image of only persons per person image by use of the person region image corresponding to the person image (step S402).

The crowd state image synthesis means 14 determines an arrangement state for each image of only persons generated in step S402 according to "arrangement of person" and "person size when synthesized with crowd patch" determined in steps S2 and S3 (step S403). The crowd state image synthesis means 14 then synthesizes each image of only persons with the background image acquired in step S1 according to the arrangement state thereby to generate a crowd patch (step S404).

The crowd state image synthesis means 14 then acquires a training label corresponding to the crowd patch (step S405). That is, the crowd state image synthesis means 14 reads the contents of the people state control designation of an item with a designated training label from the crowd state control designation storage means 23, and reads the contents of the individual person state control designation of an item with a designated training label from the person state control designation storage means 24. The read contents correspond to the training label.

The crowd state image synthesis means 14 outputs a pair of crowd patch generated in step S404 and training label acquired in step S405 (step S406). That is the end of step S4.

After step S4, the control means 16 determines whether the number of repetitions of the processings in steps S1 to S4 reaches predetermined number of times (step S5). When the number of repetitions of the processings in steps S1 to S4 does not reach the predetermined number of times (No in step S5), the control means 16 causes the background extraction means 11, the person state determination means 15 (specifically the background person state determination means 12 and the foreground person state determination means 13) and the crowd state image synthesis means 14 to repeatedly perform the processings in steps S1 to S4.

When the number of repetitions of the processings in steps S1 to S4 reaches the predetermined number of times (Yes in step S5), the processing is terminated.

The processings in steps S1 to S4 are performed once so that a pair of crowd patch and training label is acquired. Therefore, the data processing device 1 repeatedly performs the processings in steps S1 to S4 predetermined number of times so that a large amount of training data is acquired. For example, when the predetermined number of times is defined at 100000, 100000 pairs of crowd patch and training label matching with the people state control designation and the individual person state control designation are acquired.

The order of steps S1, S2 and S3 may be replaced in the flowchart illustrated in FIG. 12.

Figure 17:
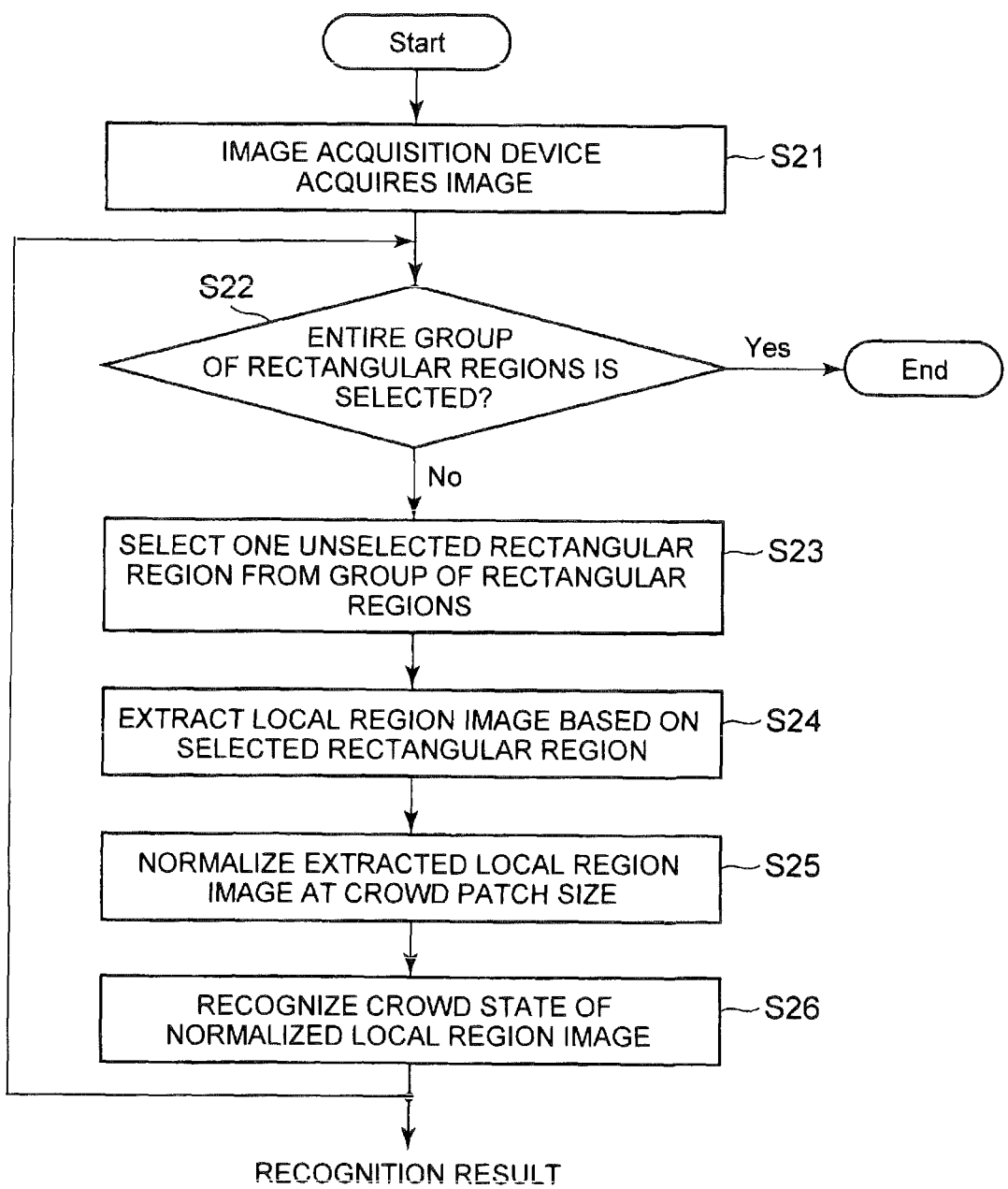
FIG. 17 It depicts a flowchart illustrating an exemplary processing progress of the crowd state recognition device.

A processing progress of the crowd state recognition device 30 according to the present invention will be described below. FIG. 17 is a flowchart illustrating an exemplary processing progress of the crowd state recognition device 30.

The image acquisition device 3 acquires an image to be recognized for a crowd state, and inputs the image into the crowd state recognition means 41 (step S21).

The crowd state recognition means 41 then determines whether the entire group of rectangular regions stored in the search window storage means 51 has been selected (step S22).

When unselected rectangular regions are present in the group of rectangular regions stored in the search window storage means 51 (No in step S22), the crowd state recognition means 41 selects one unselected rectangular region from the group of rectangular regions (step S23).

The crowd state recognition means 41 then extracts a local region image corresponding to the selected rectangular region from the image input in step S21 (step S24). The crowd state recognition means 41 then normalizes the local region image to match with the crowd patch size (step S25).

The crowd state recognition means 41 then recognizes a crowd state within the normalized local region image by use of the dictionary of the discriminator stored in the crowd state recognition dictionary storage means 52 (step S26).

After step S26, the crowd state recognition means 41 repeatedly performs the processings in and subsequent to step S22. When determining that the entire group of rectangular regions has been selected (Yes in step S22), the crowd state recognition means 41 then terminates the processing.

With the training data generating device according to the present invention, the person state determination means 15 determines the states of persons configuring a crowd according to the people state control designation (the state designations for people such as "arrangement of person," "direction of person" and "number of persons") and the individual person state control designation (the state designations for individual person such as "shooting angle of person," "illumination to person," "posture of person," "clothes of person," "body shape of person," "hairstyle of person" and "person size when synthesized with crowd patch") defined by the operator. The crowd state image synthesis means 14 then synthesizes the person images in the determined states thereby to generate a crowd patch, and reads a training label corresponding to the crowd patch. Then, the processings of determining a person state, generating a crowd patch and specifying a training label are repeatedly performed predetermined number of times so that a large amount of various training data (pairs of crowd patch and training label) for the operator-intended crowd states can be automatically generated.

Further, if a large amount of such training data is acquired, a dictionary of the discriminator can be machine-learned from the training data. Then the crowd state recognition device 30 can easily recognize a complicated crowd state in a still image by use of the dictionary.

The crowd state recognition means 41 in the crowd state recognition device 30 recognizes a crowd state in a given image by use of a dictionary learned based on crowd patches expressing crowds and training labels corresponding to the crowd patches. Therefore, the crowd state recognition means 41 recognizes a crowd state not in units of single objects such as person' head or person but in larger units of crowd as a collection of persons whose reference sites are shot. Thereby, a crowd state in a small region where the heads or individual persons cannot be recognized can be recognized.

With the crowd state recognition device 30 according to the present invention, the crowd state recognition means 41 recognizes a crowd state by use of the dictionary (the dictionary of the discriminator). Therefore, an accuracy of recognizing a crowd state does not depend on a frame rate. Thus, the crowd state recognition device according to the present invention can preferably recognize a crowd state in an image irrespective of a frame rate. For example, the crowd state recognition device 30 according to the present invention can preferably recognize a crowd state even in a still image.

The training data generating device 10 according to the above exemplary embodiment determines a person state for "arrangement of person" such as overlap between persons according to the people state control designation, and generates a crowd patch indicating the person state. When machine learning is performed by use of such a crowd patch, the states including occlusion between persons can be also learned. Therefore, even when overlap (occlusion) between persons which is difficult to recognize by head recognition or person recognition occurs, the crowd state recognition device 30 can preferably recognize a crowd state by use of the dictionary acquired as a result of the learning.

The training data generating device 10 according to the above exemplary embodiment determines a person state, generates a crowd patch shooting a person in the state, and specifies a training label corresponding to the crowd patch according to the information (the people state control designation) designating a person state of people and the information (the individual person state control designation) designating a person state of each person. Therefore, the operator defines the people state control designation or the individual person state control designation thereby to easily acquire training data for recognizing different-property crowd states. Then, the training data is machine-learned thereby to easily make the crowd state recognition device 30 for recognizing different-property crowd states.

According to the above exemplary embodiment, if the camera parameters indicating position, posture, focal distance and lens distortion of the image acquisition device (camera) 3 in a crowd shooting environment can be acquired, the people state control designation or the individual person state control designation limited to the environment can be defined by use of the camera parameters. The training data generating device 10 determines a person state according to the people state control designation or the individual person state control designation and generates training data, thereby learning a dictionary of the discriminator suitable for the crowd shooting environment. Consequently, the crowd state recognition device can recognize a complicated crowd state in a still image or the like with a high accuracy.

According to the above exemplary embodiment, if the camera parameters indicating position, posture, focal distance and lens distortion of the image acquisition device 3 in a recognition environment can be acquired, a person state for people and a person state of each person can be controlled per local region on an image. Then, large numbers of operator-intended crowd patches and training labels corresponding to the crowd patches can be automatically generated by synthesizing the person images based on the controlled person states. Then, a dictionary of the discriminator can be learned per local region on the image based on the crowd patches and the training labels, and an accuracy of recognizing a complicated crowd state can be increased by use of the dictionaries of the discriminator per region on the image.

Figure 18:
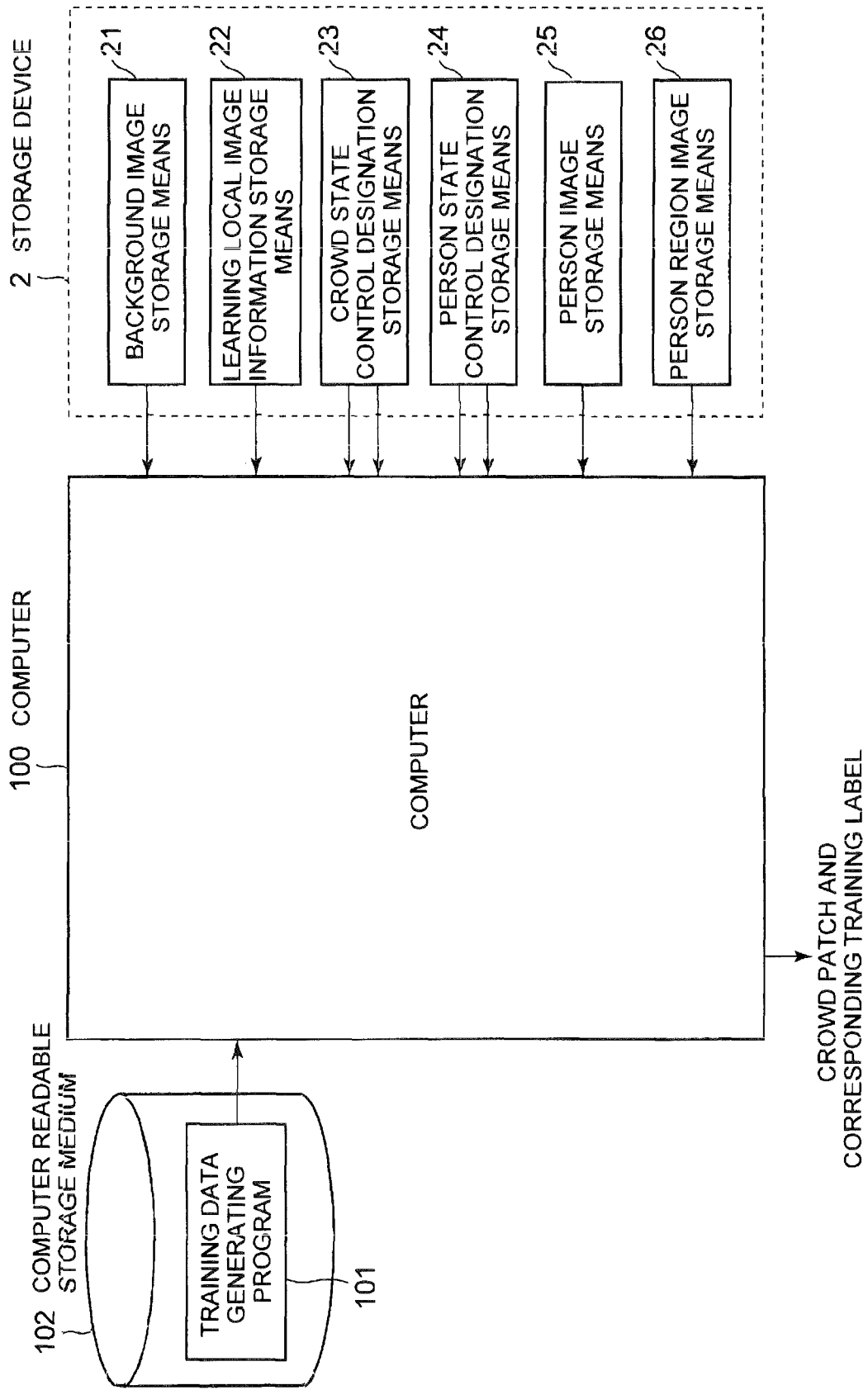
FIG. 18 It depicts a block diagram illustrating a specific structure of the training data generating device according to the present invention by way of example.

The specific structures of the training data generating device and the crowd state recognition device according to the present invention will be described below by way of example. FIG. 18 is a block diagram illustrating a specific structure of the training data generating device according to the present invention by way of example. The same components as the components illustrated in FIG. 1 are denoted with the same reference numerals as in FIG. 1, and a detailed description thereof will be omitted. In the exemplary structure illustrated in FIG. 18, the storage device 2 including the background image storage means 21, the learning local image information storage means 22, the crowd state control designation storage means 23, the person state control designation storage means 24, the person image storage means 25 and the person region image storage means 26 is connected to a computer 100. A computer readable storage medium 102 for storing a training data generating program 101 therein is also connected to the computer 100.

The computer readable storage medium 102 is realized by a magnetic disk, a semiconductor memory, or the like, for example. For example, when activated, the computer 100 reads the training data generating program 101 from the computer readable storage medium 102. The computer 100 then operates as the background extraction means 11, the person state determination means 15 (more specifically, the background person state determination means 12 and the foreground person state determination means 13), the crowd state image synthesis means 14 and the control means 16 in the data processing device 1 illustrated in FIG. 1 according to the training data generating program 101.

Figure 19:
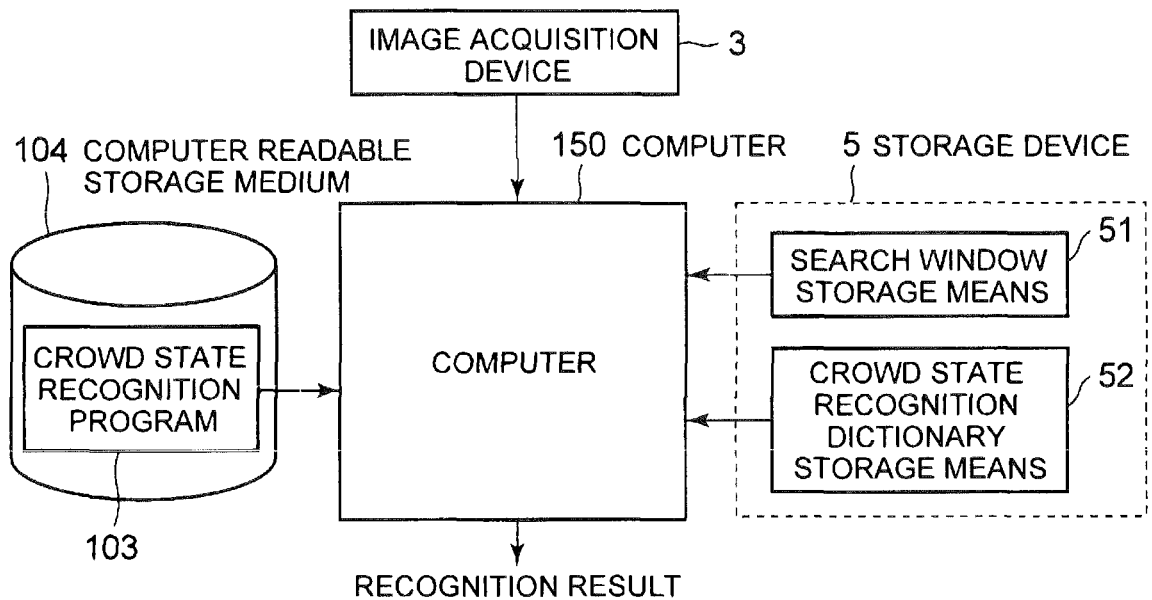
FIG. 19 It depicts a block diagram illustrating a specific structure of the crowd state recognition device according to the present invention by way of example.

FIG. 19 is a block diagram illustrating a specific structure of the crowd state recognition device according to the present invention by way of example. The same components as the components illustrated in FIG. 7 are denoted with the same reference numerals as in FIG. 7, and a detailed description thereof will be omitted. In the exemplary structure illustrated in FIG. 19, the storage device 5 including the search window storage means 51 and the crowd state recognition dictionary storage means 52 is connected to a computer 150. A computer readable storage medium 104 for storing a crowd state recognition program 103 therein is also connected to the computer 150.

The computer readable storage medium 104 is realized by a magnetic disk, a semiconductor memory, or the like, for example. For example, when activated, the computer 150 reads the crowd state recognition program 103 from the computer readable storage medium 104. The computer 150 then operates as the crowd state recognition means 41 in the data processing device 4 illustrated in FIG. 7 according to the crowd state recognition program 103.

There has been described in the above exemplary embodiment the case in which the crowd state recognition dictionary storage means 52 (see FIG. 7) stores the dictionaries acquired by learning by use of training data generated by the training data generating device 10 (see FIG. 1). In other words, there has been described in the above exemplary embodiment the case in which the dictionaries acquired by machine learning by use of a plurality of pairs of crowd patch acquired by synthesizing person images matching with person states controlled to desired states and training label for the crowd patch are stored in the crowd state recognition dictionary storage means 52.

The crowd state recognition dictionary storage means 52 may store a dictionary acquired by machine learning by use of data other than the training data generated by the training data generating device 10 as training data. Even for training data other than the training data generated by the training data generating device 10, a plurality of pairs of crowd patch including a person whose reference site is expressed as large as the size of the reference site of a person defined for the size of the crowd patch and training label for the crowd patch are prepared and may be used as training data. That is, a dictionary of the discriminator acquired by machine learning by use of the pairs of crowd patch and training label may be stored in the crowd state recognition dictionary storage means 52. Also in this case, there can be obtained an effect that a crowd state in an image can be preferably recognized irrespective of a frame rate.

Figure 20:
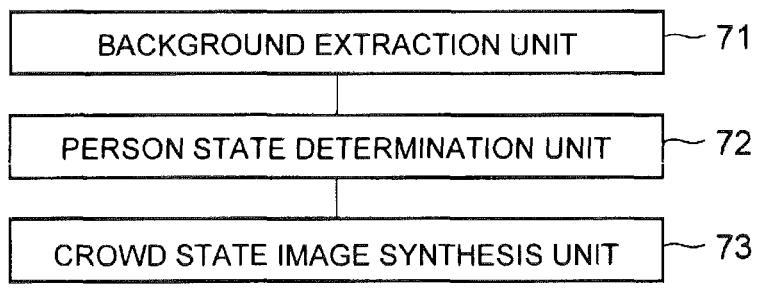
FIG. 20 It depicts a block diagram illustrating main parts in the training data generating device according to the present invention.

Main parts according to the present invention will be described below. FIG. 20 is a block diagram illustrating main parts in the training data generating device according to the present invention. The training data generating device according to the present invention includes a background extraction unit 71, a person state determination unit 72, and a crowd state image synthesis unit 73.

The background extraction unit 71 (the background extraction means 11, for example) selects a background image from a plurality of previously-prepared background images, extracts a region in the background image, and enlarges or downsize the image corresponding to the extracted region to an image at a predetermined size.

The person state determination unit 72 (the person state determination means 15, for example) determines a person state of a crowd according to the people state control designation as designation information on a person state of people and the individual person state control designation as designation information on a state of an individual person in the people.

The crowd state image synthesis unit 73 generates a crowd state image (such as crowd patch) as an image in which a person image corresponding to the person state determined by the person state determination unit 72 is synthesized with the image at a predetermined size acquired by the background extraction unit 71, specifies a training label for the crowd state image, and outputs a pair of crowd state image and training label.

For example, the background extraction unit 71, the person state determination unit 72, and the crowd state image synthesis unit 73 sequentially repeats the operations. The operations of the background extraction unit 71, the person state determination unit 72, and the crowd state image synthesis unit 73 may not be sequentially performed. For example, the background extraction unit 71 and the person state determination unit 72 may perform the operations in parallel.

With the structure, a large amount of training data used for machine-learning a dictionary of the discriminator for recognizing a crowd state can be easily generated.

Figure 21:
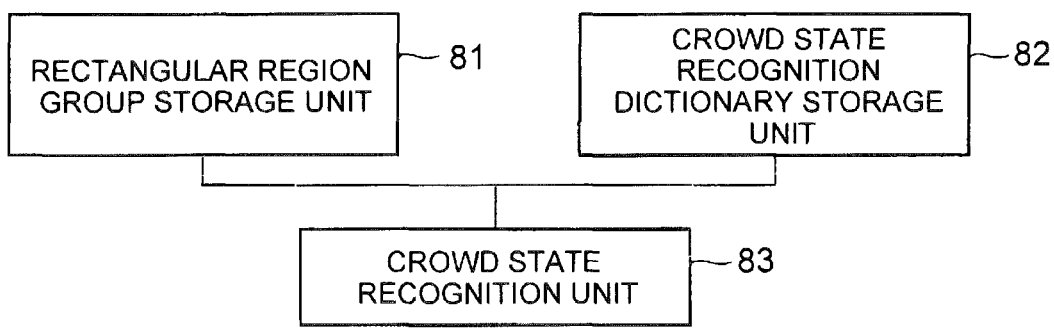
FIG. 21 It depicts a block diagram illustrating main parts in the crowd state recognition device according to the present invention.

FIG. 21 is a block diagram illustrating main parts in the crowd state recognition device according to the present invention. The crowd state recognition device according to the present invention includes a rectangular region group storage unit 81, a crowd state recognition dictionary storage unit 82, and a crowd state recognition unit 83.

The rectangular region group storage unit 81 (the search window storage means 51, for example) stores a group of rectangular regions indicating portions to be recognized for a crowd state on an image.

The crowd state recognition dictionary storage unit 82 (the crowd state recognition dictionary storage means 52, for example) stores a dictionary of the discriminator acquired by machine-learning by use of a plurality of pairs of crowd state image (such as crowd patch) as an image including a person whose reference site is expressed as large as the size of the reference site of a person defined for a predetermined size of the image expressing a crowd state therein and training label for the crowd state image.

The crowd state recognition unit 83 (the crowd state recognition means 41, for example) extracts regions indicated by the group of rectangular regions stored in the rectangular region group storage unit 81 from a given image, and recognizes states of the crowds shot in the extracted images based on the dictionary.

With the structure, a crowd state in an image can be preferably recognized irrespective of a frame rate.

Part or all of the above exemplary embodiment can be described as in the following supplementary notes, but is not limited to the following.

(Supplementary Note 1)

A training data generating device including:
  a background extraction means for selecting a background image from a plurality of previously-prepared background images, extracting a region in the background image, and enlarging or downsizing the image corresponding to the extracted region to an image at a predetermined size;
  a person state determination means for determining a person state of a crowd according to a people state control designation as designation information on a person state of people and an individual person state control designation as designation information on a state of an individual person in the people; and
  a crowd state image synthesis means for generating a crowd state image as an image in which a person image corresponding to the person state determined by the person state determination means is synthesized with the image at a predetermined size acquired by the background extraction means, specifying a training label for the crowd state image, and outputting a pair of crowd state image and training label.

(Supplementary Note 2)

The training data generating device according to Supplementary Note 1,
  wherein the person state determination means temporarily determines a person state of a crowd according to the people state control designation and the individual person state control designation, determines the temporarily-determined person state as the person state of the crowd when the temporarily-determined person state meets conditions for the size of a reference site of a person defined for the predetermined size and how the reference site is expressed, and repeatedly makes the temporary determination of the person state of the crowd when the temporarily-determined person state does not meet the conditions.

(Supplementary Note 3)

The training data generating device according to Supplementary Note 1 or 2, including:
  a crowd state control designation storage means for storing the people state control designation defined per item and storing the presence of a designated training label defined for the item; and
  a person state control designation storage means for storing the individual person state control designation defined per item and storing the presence of a designated training label defined for the item,
  wherein the person state determination means determines a person state of a crowd according to the people state control designation stored in the crowd state control designation storage means and the individual person state control designation stored in the person state control designation storage means, and
  the crowd state image synthesis means specifies a training label by reading the people state control designation of an item defined as having a designated training label from the crowd state control designation storage means and reading the individual person state control designation of an item defined as having a designated training label from the person state control designation storage means.

(Supplementary Note 4)

The training data generating device according to Supplementary Note 3,
  wherein the crowd state control designation storage means stores at least one item as having a designated training label, and
  the crowd state image synthesis means reads the people state control designation of an item defined as having a designated training label from the crowd state control designation storage means.

(Supplementary Note 5)

The training data generating device according to Supplementary Note 3 or 4,
  wherein the crowd state control designation storage means stores the people state control designation and the presence of a designated training label per item such as arrangement of person, direction of person, and number of persons, and stores the people state control designation corresponding to each item in any one of a first form of designating a specific state, a second form of designating that an arbitrary state may be defined, and a third form of designating that a state may be defined within a defined rule, the person state control designation storage means stores the individual person state designation and the presence of a designated training label per item such as shooting angle of person, illumination to person, posture of person, clothes of person, body shape of person, hairstyle of person, and person size when synthesized with crowd state image, and stores the individual person state control designation corresponding to each item in any one of the first form, the second form and the third form, and the person state determination means determines a person state of a crowd according to the people state control designation stored in the crowd state control designation storage means and the individual person state control designation stored in the person state control designation storage means.

(Supplementary Note 6)

The training data generating device according to any one of Supplementary Notes 1 to 5, wherein the crowd state image synthesis means selects a person image matching with the determined person states such as direction of person, number of persons, shooting angle of person, illumination to person, posture of person, clothes of person, body shape of person, and hairstyle of person from a group of previously-prepared person images, crops the region of a person from the selected person image thereby to generate an image of only the person, and synthesizes the image of only the person with the image at a predetermined size acquired by the background extraction means according to arrangement of person and person size when synthesized with crowd state image determined as the person states.

(Supplementary Note 7)

The training data generating device according to Supplementary Note 6, wherein the crowd state image synthesis means sequentially synthesizes from an image of only a person corresponding to the farthest arrangement position from a camera with the image at a predetermined size acquired by the background extraction means.

(Supplementary Note 8)

The training data generating device according to any one of Supplementary Notes 1 to 7, wherein the person state determination means includes:

a background person state determination means for temporarily determining a person state of a crowd as the background in a crowd state image according to the people state control designation and the individual person state control designation, determining the temporarily-determined person state as the person state of the crowd as the background when the temporarily-determined person state meets a first condition for the size of the reference site of a person defined for the predetermined size of the crowd state image and how the reference site is expressed, and repeatedly making the temporary determination of the person state of the crowd as the background when the temporarily-determined person state does not meet the first condition; and a foreground person state determination means for temporarily determining a person state of a crowd as the foreground in a crowd state image according to the people state control designation and the individual person state control designation, determining the temporarily-determined person state as the person state of the crowd as the foreground when the temporarily-determined person state meets a second condition for the size of the reference site defined for the predetermined size of the crowd state image and how the reference site is expressed, and repeatedly making the temporary determination of the person state of the crowd as the foreground when the temporarily-determined person state does not meet the second condition.

(Supplementary Note 9)

The training data generating device according to Supplementary Note 8, wherein the first condition is that the reference site of a person is not within a crowd state image or that the size of the reference site is much larger or much smaller than the size of the reference site of a person defined for the predetermined size, and the second condition is that the reference site of a person is within a crowd state image and the size of the reference site is as large as the size of the reference site of a person defined for the predetermined size.

(Supplementary Note 10)

A crowd state recognition device including:

a rectangular region group storage means for storing a group of rectangular regions indicating portions to be recognized for a crowd state on an image;

a crowd state recognition dictionary storage means for storing a dictionary of a discriminator acquired by machine learning by use of a plurality of pairs of crowd state image as an image which expresses a crowd state at a predetermined size and includes a person whose reference site is expressed as large as the size of the reference site of a person defined for the predetermined size, and training label for the crowd state image; and a crowd state recognition means for extracting regions indicated in the group of rectangular regions stored in the rectangular region group storage means from a given image, and recognizing states of the crowds shot in the extracted images based on the dictionary.

(Supplementary Note 11)

The crowd state recognition device according to Supplementary Note 10, wherein the crowd state recognition dictionary storage means stores a dictionary of the discriminator acquired by machine learning by use of a plurality of pairs of crowd state image acquired by synthesizing person images matching with person states controlled to desired states and training label for the crowd state image, and the crowd state recognition means recognizes states of the crowds shot in the images based on the dictionary.

(Supplementary Note 12)

The crowd state recognition device according to Supplementary Note 10 or 11, wherein the rectangular region group storage means stores a group of size-defined rectangular regions based on camera parameters indicating position, posture, focal distance and lens distortion of an image acquisition device for acquiring an image, and the size of the reference site of a person defined for the predetermined size, and the crowd state recognition means extracts regions indicated in the group of rectangular regions from a given image.

(Supplementary Note 13)

The crowd state recognition device according to any one of Supplementary Notes 10 to 12, wherein the crowd state recognition dictionary storage means stores a dictionary of the discriminator acquired by changing the number of persons expressed in a crowd state image and by machine learning by use of a plurality of pairs of crowd state image and training label prepared for the number of persons, and the crowd state recognition means recognizes the number of persons in the crowd shot in the image based on the dictionary.

(Supplementary Note 14)

The crowd state recognition device according to any one of Supplementary Notes 10 to 13, wherein the crowd state recognition dictionary storage means stores a dictionary of the discriminator acquired by changing directions of persons expressed in a crowd state image and by machine learning by use of a plurality of pairs of crowd state image and training label prepared for the directions of persons, and the crowd state recognition means recognizes the direction of the crowd shot in the image based on the dictionary.

(Supplementary Note 15)

The crowd state recognition device according to any one of Supplementary Notes 10 to 14, wherein the crowd state recognition dictionary storage means stores a dictionary of the discriminator acquired by machine learning by use of a plurality of pairs of crowd state image and training label prepared for a non-remarkably congested crowd and a remarkably congested crowd, and the crowd state recognition means recognizes whether the crowd shot in an image is remarkably congested based on the dictionary.

(Supplementary Note 16)

The crowd state recognition device according to any one of Supplementary Notes 10 to 15, wherein the crowd state recognition dictionary storage means stores a dictionary of the discriminator acquired by machine learning by use of a plurality of pairs of crowd state image and training label prepared for a crowd in which directions of persons are unified and a crowd in which directions of persons are not unified, and the crowd state recognition means recognizes whether directions of persons in the crowd shot in an image are unified based on the dictionary.

(Supplementary Note 17)

A training data generating method including:

a background extraction step of selecting a background image from a plurality of previously-prepared background images, extracting a region in the background image, and enlarging or downsizing the image corresponding to the extracted region to an image at a predetermined size;

a person state determination step of determining a person state of a crowd according to a people state control designation as designation information on a person state of people and an individual person state control designation as designation information on a state of an individual person in the people; and a crowd state image synthesis step of generating a crowd state image as an image in which a person image corresponding to the person state determined in the person state determination step is synthesized with the image at a predetermined size acquired in the background extraction step, specifying a training label for the crowd state image, and outputting a pair of crowd state image and training label.

(Supplementary Note 18)

The training data generating method according to Supplementary Note 17, including:

the person state determination step of temporarily determining a person state of a crowd according to the people state control designation and the individual person state control designation, determining the temporarily-determined person state as the person state of the crowd when the temporarily-determined person state meets conditions for the size of a reference site of a person defined for the predetermined size and how the reference site is expressed, and repeatedly making the temporary determination of the person state of the crowd when the temporarily-determined person state does not meet the conditions.

(Supplementary Note 19)

The training data generating method according to Supplementary Note 17 or 18, wherein a crowd state control designation storage means stores the people state control designation defined per item and storing the presence of a designated training label defined for the item, and a person state control designation storage means stores the individual person state control designation defined per item and storing the presence of a designated training label defined for the item, the method including:

the person state determination step of determining a person state of a crowd according to the people state control designation stored in the crowd state control designation storage means and the individual person state control designation stored in the person state control designation storage means; and the crowd state image synthesis step of specifying a training label by reading the people state control designation of an item defined as having a designated training label from the crowd state control designation storage means and reading the individual person state control designation of an item defined as having a designated training label from the person state control designation storage means.

(Supplementary Note 20)

The training data generating method according to Supplementary Note 19, wherein the crowd state control designation storage means stores at least one item as having a designated training label, the method including the crowd state image synthesis step of reading the people state control designation of an item defined as having a designated training label from the crowd state control designation storage means.

(Supplementary Note 21)

The training data generating method according to Supplementary Note 19 or 20, wherein the crowd state control designation storage means stores the people state control designation and the presence of a designated training label per item such as arrangement of person, direction of person, and number of persons, and stores the people state control designation corresponding to each item in any one of a first form of designating a specific state, a second form of designating that an arbitrary state may be defined, and a third form of designating that a state may be defined within a defined rule, and the person state control designation storage means stores the individual person state designation and the presence of a designated training label per item such as shooting angle of person, illumination to person, posture of person, clothes of person, body shape of person, hairstyle of person, and person size when synthesized with crowd state image, and stores the individual person state control designation corresponding to each item in any one of the first form, the second form and the third form, the method including the person state determination step of determining a person state of a crowd according to the people state control designation stored in the crowd state control designation storage means and the individual person state control designation stored in the person state control designation storage means.

(Supplementary Note 22)

The training data generating method according to any one of Supplementary Notes 17 to 21, including:

the crowd state image synthesis step of selecting a person image matching with the determined person states such as direction of person, number of persons, shooting angle of person, illumination to person, posture of person, clothes of person, body shape of person, and hairstyle of person from a group of previously-prepared person images, cropping the region of a person from the selected person image thereby to generate an image of only the person, and synthesizing the image of only the person with the image at a predetermined size acquired by the background extraction means according to arrangement of person and person size when synthesized with crowd state image determined as the person states.

(Supplementary Note 23)

The training data generating method according to Supplementary Note 22, including:

the crowd state image synthesis step of sequentially synthesizing from an image of only a person corresponding to the farthest arrangement position from a camera with the image at a predetermined size acquired by the background extraction means.

(Supplementary Note 24)

The training data generating method according to any one of Supplementary Notes 17 to 23, wherein the person state determination step includes:

a background person state determination step of temporarily determining a person state of a crowd as the background in a crowd state image according to the people state control designation and the individual person state control designation, determining the temporarily-determined person state as the person state of the crowd as the background when the temporarily-determined person state meets a first condition for the size of the reference site of a person defined for the predetermined size of the crowd state image and how the reference site is expressed, and repeatedly making the temporary determination of the person state of the crowd as the background when the temporarily-determined person state does not meet the first condition; and a foreground person state determination step of temporarily determining a person state of a crowd as the foreground in a crowd state image according to the people state control designation and the individual person state control designation, determining the temporarily-determined person state as the person state of the crowd as the foreground when the temporarily-determined person state meets a second condition for the size of the reference site defined for the predetermined size of the crowd state image and how the reference site is expressed, and repeatedly making the temporary determination of the person state of the crowd as the foreground when the temporarily-determined person state does not meet the second condition.

(Supplementary Note 25)

The training data generating method according to Supplementary Note 24, wherein the first condition is that the reference site of a person is not within a crowd state image or that the size of the reference site is much larger or much smaller than the size of the reference site of a person defined for the predetermined size, and the second condition is that the reference site of a person is within a crowd state image and the size of the reference site is as large as the size of the reference site of a person defined for the predetermined size.

(Supplementary Note 26)

A crowd state recognition method, wherein a rectangular region group storage means stores a group of rectangular regions indicating portions to be recognized for a crowd state on an image, and a crowd state recognition dictionary storage means stores a dictionary of a discriminator acquired by machine learning by use of a plurality of pairs of crowd state image as an image which expresses a crowd state at a predetermined size and includes a person whose reference site is expressed as large as the size of the reference site of a person defined for the predetermined size, and training label for the crowd state image, the method including a crowd state recognition step of extracting regions indicated in the group of rectangular regions stored in the rectangular region group storage means from a given image, and recognizing states of the crowds shot in the extracted images based on the dictionary.

(Supplementary Note 27)

The crowd state recognition method according to Supplementary Note 26, wherein the crowd state recognition dictionary storage means stores a dictionary of the discriminator acquired by machine learning by use of a plurality of pairs of crowd state image acquired by synthesizing person images matching with person states controlled to desired states and training label for the crowd state image, the method including the crowd state recognition step of recognizing states of the crowds shot in the images based on the dictionary.

(Supplementary Note 28)

The crowd state recognition method according to Supplementary Note 26 or 27, wherein the rectangular region group storage means stores a group of size-defined rectangular regions based on camera parameters indicating position, posture, focal distance and lens distortion of an image acquisition device for acquiring an image, and the size of the reference site of a person defined for the predetermined size, the method including the crowd state recognition step of extracting regions indicated in the group of rectangular regions from a given image.

(Supplementary Note 29)

The crowd state recognition method according to any one of Supplementary Notes 26 to 28,
- wherein the crowd state recognition dictionary storage means stores a dictionary of the discriminator acquired by changing the number of persons expressed in a crowd state image and by machine learning by use of a plurality of pairs of crowd state image and training label prepared for the number of persons,
- the method including the crowd state recognition step of recognizing the number of persons in the crowd shot in the image based on the dictionary.

(Supplementary Note 30)

The crowd state recognition method according to any one of Supplementary Notes 26 to 29,
- wherein the crowd state recognition dictionary storage means stores a dictionary of the discriminator acquired by changing directions of persons expressed in a crowd state image and by machine learning by use of a plurality of pairs of crowd state image and training label prepared for the directions of persons,
- the method including the crowd state recognition step of recognizing the direction of the crowd shot in the image based on the dictionary.

(Supplementary Note 31)

The crowd state recognition method according to any one of Supplementary Notes 26 to 30,
- wherein the crowd state recognition dictionary storage means stores a dictionary of the discriminator acquired by machine learning by use of a plurality of pairs of crowd state image and training label prepared for a non-remarkably congested crowd and a remarkably congested crowd,
- the method including the crowd state recognition step of recognizing whether the crowd shot in an image is remarkably congested based on the dictionary.

(Supplementary Note 32)

The crowd state recognition method according to any one of Supplementary Notes 26 to 31,
- wherein the crowd state recognition dictionary storage means stores a dictionary of the discriminator acquired by machine learning by use of a plurality of pairs of crowd state image and training label prepared for a crowd in which directions of persons are unified and a crowd in which directions of persons are not unified,
- the method including the crowd state recognition step of recognizing whether directions of persons in the crowd shot in an image are unified based on the dictionary.

(Supplementary Note 33)

A training data generating program for causing a computer to perform:
- a background extraction processing of selecting a background image from a plurality of previously-prepared background images, extracting a region in the background image, and enlarging or downsizing the image corresponding to the extracted region to an image at a predetermined size;
- a person state determination processing of determining a person state of a crowd according to a people state control designation as designation information on a person state of people and an individual person state control designation as designation information on a state of an individual person in the people; and
- a crowd state image synthesis processing of generating a crowd state image as an image in which a person image corresponding to the person state determined in the person state determination processing is synthesized with the image at a predetermined size acquired in the background extraction processing, specifying a training label for the crowd state image, and outputting a pair of crowd state image and training label.

(Supplementary Note 34)

The training data generating program according to Supplementary Note 33, the program for causing a computer to perform:
- the person state determination processing of temporarily determining a person state of a crowd according to the people state control designation and the individual person state control designation, determining the temporarily-determined person state as the person state of the crowd when the temporarily-determined person state meets conditions for the size of a reference site of a person defined for the predetermined size and how the reference site is expressed, and repeatedly making the temporary determination of the person state of the crowd when the temporarily-determined person state does not meet the conditions.

(Supplementary Note 35)

The training data generating program according to Supplementary Note 33 or 34, the program for causing a computer including a crowd state control designation storage means for storing the people state control designation defined per item and storing the presence of a designated training label defined for the item, and a person state control designation storage means for storing the individual person state control designation defined per item and storing the presence of a designated training label defined for the item to perform:
- the person state determination step of determining a person state of a crowd according to the people state control designation stored in the crowd state control designation storage means and the individual person state control designation stored in the person state control designation storage means, and
- the crowd state image synthesis step of specifying a training label by reading the people state control designation of an item defined as having a designated training label from the crowd state control designation storage means and reading the individual person state control designation of an item defined as having a designated training label from the person state control designation storage means.

(Supplementary Note 36)

The training data generating program according to Supplementary Note 35, the program for causing a computer including the crowd state control designation storage means for storing at least one item as having a designated training label to perform:
- the crowd state image synthesis processing of reading the people state control designation of an item defined as having a designated training label from the crowd state control designation storage means.

(Supplementary Note 37)

The training data generating program according to Supplementary Note 35 or 36, the program for causing a computer including the crowd state control designation storage means for storing the people state control designation and the presence of a designated training label per item such as arrangement of person, direction of person, and number of persons, and stores the people state control designation corresponding to each item in any one of a first form of designating a specific state, a second form of designating that an arbitrary state may be defined, and a third form of designating that a state may be defined within a defined rule, and the person state control designation storage means for storing the individual person state designation and the presence of a designated training label per item such as shooting angle of person, illumination to person, posture of person, clothes of person, body shape of person, hairstyle of person, and person size when synthesized with crowd state image, and stores the individual person state control designation corresponding to each item in any one of the first form, the second form and the third form to perform:

the person state determination processing of determining a person state of a crowd according to the people state control designation stored in the crowd state control designation storage means and the individual person state control designation stored in the person state control designation storage means.

(Supplementary Note 38)

The training data generating program according to any one of Supplementary Notes 33 to 37, the program for causing a computer to perform:

the crowd state image synthesis processing of selecting a person image matching with the determined person states such as direction of person, number of persons, shooting angle of person, illumination to person, posture of person, clothes of person, body shape of person, and hairstyle of person from a group of previously-prepared person images, cropping the region of a person from the selected person image thereby to generate an image of only the person, and synthesizing the image of only the person with the image at a predetermined size acquired by the background extraction means according to arrangement of person and person size when synthesized with crowd state image determined as the person states.

(Supplementary Note 39)

The training data generating program according to Supplementary Note 38, the program for causing a computer to perform:

the crowd state image synthesis processing of sequentially synthesizing from an image of only a person corresponding to the farthest arrangement position from a camera with the image at a predetermined size acquired by the background extraction means.

(Supplementary Note 40)

The training data generating program according to any one of Supplementary Notes 33 to 39, the program for causing a computer to perform in the person state determination processing:

a background person state determination processing of temporarily determining a person state of a crowd as the background in a crowd state image according to the people state control designation and the individual person state control designation, determining the temporarily-determined person state as the person state of the crowd as the background when the temporarily-determined person state meets a first condition for the size of the reference site of a person defined for the predetermined size of the crowd state image and how the reference site is expressed, and repeatedly making the temporary determination of the person state of the crowd as the background when the temporarily-determined person state does not meet the first condition; and a foreground person state determination processing of temporarily determining a person state of a crowd as the foreground in a crowd state image according to the people state control designation and the individual person state control designation, determining the temporarily-determined person state as the person state of the crowd as the foreground when the temporarily-determined person state meets a second condition for the size of the reference site defined for the predetermined size of the crowd state image and how the reference site is expressed, and repeatedly making the temporary determination of the person state of the crowd as the foreground when the temporarily-determined person state does not meet the second condition.

(Supplementary Note 41)

The training data generating program according to Supplementary Note 40, wherein the first condition is that the reference site of a person is not within a crowd state image or that the size of the reference site is much larger or much smaller than the size of the reference site of a person defined for the predetermined size, and the second condition is that the reference site of a person is within a crowd state image and the size of the reference site is as large as the size of the reference site of a person defined for the predetermined size.

(Supplementary Note 42)

A crowd state recognition program for causing a computer including a rectangular region group storage means for storing a group of rectangular regions indicating portions to be recognized for a crowd state on an image, and a crowd state recognition dictionary storage means for storing a dictionary of a discriminator acquired by machine learning by use of a plurality of pairs of crowd state image as an image which expresses a crowd state at a predetermined size and includes a person whose reference site is expressed as large as the size of the reference site of a person defined for the predetermined size, and training label for the crowd state image to perform:

a crowd state recognition processing of extracting regions indicated in the group of rectangular regions stored in the rectangular region group storage means from a given image, and recognizing states of the crowds shot in the extracted images based on the dictionary.

(Supplementary Note 43)

The crowd state recognition program according to Supplementary Note 42, the program for causing a computer including the crowd state recognition dictionary storage means for storing a dictionary of the discriminator acquired by machine learning by use of a plurality of pairs of crowd state image acquired by synthesizing person images matching with person states controlled to desired states and training label for the crowd state image to perform:

the crowd state recognition processing of recognizing states of the crowds shot in the images based on the dictionary.

(Supplementary Note 44)

The crowd state recognition program according to Supplementary Note 42 or 43, the program for causing a computer including the rectangular region group storage means for storing a group of size-defined rectangular regions based on camera parameters indicating position, posture, focal distance and lens distortion of an image acquisition device for acquiring an image, and the size of the reference site of a person defined for the predetermined size to perform:

the crowd state recognition processing of extracting regions indicated in the group of rectangular regions from a given image.

(Supplementary Note 45)

The crowd state recognition program according to any one of Supplementary Notes 42 to 44, the program for causing a computer including the crowd state recognition dictionary storage means for storing a dictionary of the discriminator acquired by changing the number of persons expressed in a crowd state image and by machine learning by use of a plurality of pairs of crowd state image and training label prepared for the number of persons to perform:

the crowd state recognition processing of recognizing the number of persons in the crowd shot in the image based on the dictionary.

(Supplementary Note 46)

The crowd state recognition program according to any one of Supplementary Notes 42 to 45, the program for causing a computer including the crowd state recognition dictionary storage means for storing a dictionary of the discriminator acquired by changing directions of persons expressed in a crowd state image and by machine learning by use of a plurality of pairs of crowd state image and training label prepared for the directions of persons to perform:

the crowd state recognition processing of recognizing the direction of the crowd shot in the image based on the dictionary.

(Supplementary Note 47)

The crowd state recognition program according to any one of Supplementary Notes 42 to 46, the program for causing a computer including the crowd state recognition dictionary storage means for storing a dictionary of the discriminator acquired by machine learning by use of a plurality of pairs of crowd state image and training label prepared for a non-remarkably congested crowd and a remarkably congested crowd to perform:

the crowd state recognition processing of recognizing whether the crowd shot in an image is remarkably congested based on the dictionary.

(Supplementary Note 48)

The crowd state recognition program according to any one of Supplementary Notes 42 to 47, the program for causing a computer including the crowd state recognition dictionary storage means for storing a dictionary of the discriminator acquired by machine learning by use of a plurality of pairs of crowd state image and training label prepared for a crowd in which directions of persons are unified and a crowd in which directions of persons are not unified to perform:

the crowd state recognition processing of recognizing whether directions of persons in the crowd shot in an image are unified based on the dictionary.

The present invention has been described with reference to the exemplary embodiment, but the present invention is not limited to the above exemplary embodiment. The structure and details of the present invention can be variously changed within the scope of the present invention understandable by those skilled in the art.

The present application claims the priority based on Japanese Patent Application No. 2013-135915 filed on Jun. 28, 2013, the disclosure of which is all incorporated herein by reference.

INDUSTRIAL APPLICABILITY

The present invention is suitably applicable to a training data generating device for generating training data when learning a dictionary of a discriminator used for recognizing a crowd state.

The present invention is suitably applied to a crowd state recognition device for recognizing a crowd state in an image. In particular, the present invention is suitably applicable to recognize a crowd state in an image at a low frame rate. Further, the present invention can be suitably used also when a frame rate is not stable and a crowd state recognition processing using time information cannot be performed. Further, the present invention can be suitably used for recognizing a complicated crowd state including overlap between persons from a still image. Further, the present invention can be used for suspicious person recognition, left suspicious object recognition, tailgating recognition, abnormal state recognition, abnormal behavior recognition, and the like in the field of monitoring for recognizing a crowd state from an image acquired by a camera. Furthermore, the present invention may be used for outputting a recognition result of a crowd state in an image together with a position (2D position or 3D position) of the crowd to other system. Furthermore, the present invention can be used for acquiring a recognition result of a crowd state in an image and a position (2D position or 3D position) of the crowd and making video search with the acquisition as a trigger.

REFERENCE SIGNS LIST

11 Background extraction means
12 Background person state determination means
13 Foreground person state determination means
14 Crowd state image synthesis means
15 Person state determination means
16 Control means
21 Background image storage means
22 Learning local image information storage means
23 Crowd state control designation storage means
24 Person state control designation storage means
25 Person image storage means
26 Person region image storage means
41 Crowd state recognition means
51 Search window storage means
52 Crowd state recognition dictionary storage means

The invention claimed is:

1. A training data generating device comprising:
at least one processor configured to:
generate a crowd state image as an image in which a person image corresponding to a person state is synthesized with previously-prepared image at a predetermined size, the previously-prepared image being a background image that include no person;
specify a training label for the crowd state image; and
output a pair of crowd state image and training label.

2. The training data generating device according to claim 1,
wherein the at least one processor is further configured to determine the person state of a crowd according to a people state control designation as designation information on a person state of people and an individual person state control designation as designation information on a state of an individual person in the people.

3. The training data generating device according to claim 1,
wherein the background image is captured image of a place which is captured as the person image when the person exists in the place, the background image being captured when no person exists in the place.

4. The training data generating device according to claim 1,
wherein the background image is generated using a computer graphics technology.

5. The training data generating device according to claim 1,
wherein the previously-prepared image is an image prepared by selecting a background image from a plurality of previously-prepared background images, extracting a region in the background image, and enlarging or downsizing the image corresponding to the extracted region to an image at a predetermined size.

6. The training data generating device according to claim 1,
wherein the at least one processor temporarily determines a person state of a crowd according to the people state control designation and the individual person state control designation, determines the temporarily-determined person state as the person state of the crowd when the temporarily-determined person state meets conditions for the size of a reference site of a person defined for the predetermined size and how the reference site is expressed, and repeatedly makes the temporary determination of the person state of the crowd when the temporarily-determined person state does not meet the conditions.

7. The training data generating device according to claim 1, comprising:
at least one storage storing the people state control designation defined per item and store the presence of a designated training label defined for the item, and
wherein the at least one storage stores the individual person state control designation defined per item and stores the presence of a designated training label defined for the item,
wherein the at least one processor is configured to determine a person state of a crowd according to the people state control designation stored in the at least one storage and the individual person state control designation stored in the at least one storage, and
the at least one processor is configured to specify a training label by reading the people state control designation of an item defined as having a designated training label from the at least one storage and reading the individual person state control designation of an item defined as having a designated training label from the at least one storage.

8. The training data generating device according to claim 7,
wherein the at least one storage stores at least one item as having a designated training label, and
the at least one processor is configured to read the people state control designation of an item defined as having a designated training label from the at least one storage.

9. The training data generating device according to claim 7,
wherein the at least one storage stores the people state control designation and the presence of a designated training label per item such as arrangement of person, direction of person, and number of persons, and stores the people state control designation corresponding to each item in any one of a first form of designating a specific state, a second form of designating that an arbitrary state may be defined, and a third form of designating that a state may be defined within a defined rule,
the at least one storage stores the individual person state designation and the presence of a designated training label per item such as shooting angle of person, illumination to person, posture of person, clothes of person, body shape of person, hairstyle of person, and person size when synthesized with crowd state image, and stores the individual person state control designation corresponding to each item in any one of the first form, the second form and the third form, and
the at least one processor is configured to determine a person state of a crowd according to the people state control designation stored in the at least one storage and the individual person state control designation stored in the at least one storage.

10. The training data generating device according to claim 1,
wherein the at least one processor is configured to select a person image matching with the determined person states such as direction of person, number of persons, shooting angle of person, illumination to person, posture of person, clothes of person, body shape of person, and hairstyle of person from a group of previously-prepared person images, crops the region of a person from the selected person image thereby to generate an image of only the person, and synthesize the image of only the person with the image at a predetermined size according to arrangement of person and person size when synthesized with crowd state image determined as the person states.

11. The training data generating device according to claim 10,
wherein the at least one processor sequentially synthesizes from an image of only a person corresponding to the farthest arrangement position from a camera with the image at a predetermined size.

12. The training data generating device according to claim 1,
wherein the at least one processor temporarily determines a person state of a crowd as the background in a crowd state image according to the people state control designation and the individual person state control designation, determines the temporarily-determined person state as the person state of the crowd as the background when the temporarily-determined person state meets a first condition for the size of the reference site of a person defined for the predetermined size of the crowd state image and how the reference site is expressed, and repeatedly makes the temporary determination of the person state of the crowd as the background when the temporarily-determined person state does not meet the first condition; and
the at least one processor temporarily determines a person state of a crowd as the foreground in a crowd state image according to the people state control designation and the individual person state control designation, determines the temporarily-determined person state as the person state of the crowd as the foreground when the temporarily-determined person state meets a second condition for the size of the reference site defined for the predetermined size of the crowd state image and how the reference site is expressed, and repeatedly makes the temporary determination of the person state of the crowd as the foreground when the temporarily-determined person state does not meet the second condition.

13. The training data generating device according to claim 12,
wherein the first condition is that the reference site of a person is not within a crowd state image or that the size of the reference site is much larger or much smaller than the size of the reference site of a person defined for the predetermined size, and the second condition is that the reference site of a person is within a crowd state image and the size of the reference site is as large as the size of the reference site of a person defined for the predetermined size.

* * * * *